US010641383B2

(12) United States Patent
Sato et al.

(10) Patent No.: US 10,641,383 B2
(45) Date of Patent: May 5, 2020

(54) VEHICLE CONTROL APPARATUS

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Shun Sato, Toyota (JP); Masato Yoshikawa, Toyota (JP); Nobufusa Kobayashi, Anjo (JP); Daisuke Suyama, Anjo (JP); Kazuomi Okasaka, Anjo (JP); Atsushi Kayukawa, Anjo (JP); Mitsuru Maeda, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/055,311

(22) Filed: Aug. 6, 2018

(65) Prior Publication Data

US 2019/0048999 A1 Feb. 14, 2019

(30) Foreign Application Priority Data

Aug. 8, 2017 (JP) ................................ 2017-153719

(51) Int. Cl.
*B60K 6/543* (2007.10)
*B60K 6/547* (2007.10)
(Continued)

(52) U.S. Cl.
CPC ......... *F16H 61/0206* (2013.01); *B60K 6/543* (2013.01); *B60K 6/547* (2013.01);
(Continued)

(58) Field of Classification Search
CPC ..... B60K 6/543; B60K 6/547; B60W 10/101; B60W 10/11; B60W 20/30
See application file for complete search history.

(56) References Cited

U.S. PATENT DOCUMENTS

2006/0166784 A1* 7/2006 Tabata .................. B60K 6/445 477/37
2008/0153651 A1* 6/2008 Matsubara ............ B60W 20/30 475/151

(Continued)

FOREIGN PATENT DOCUMENTS

JP 2006-009942 A 1/2006
JP 2017-194102 A 10/2017

*Primary Examiner* — Tisha D Lewis
(74) *Attorney, Agent, or Firm* — Oliff PLC

(57) ABSTRACT

A control apparatus includes a shifting delay control portion configured to delay a moment of generation of a shift-down command to implement a power-on shift-down action of the step-variable transmission, with respect to a moment of determination to implement the power-on shift-down action, for thereby reducing a shifting shock of the step-variable transmission in the process of the power-on shift-down action. The shifting delay control portion adjusts a delay time from the moment of determination to implement the power-on shift-down action to the moment of generation of the shift-down command, on the basis of at least one of an output state of the drive power source; an inertia power required in the process of the power-on shift-down action; a consumption power to be consumed by the coupling devices; and a state of a battery to and from which an electric power is respectively supplied from and to the motor/generator.

7 Claims, 10 Drawing Sheets

(51) Int. Cl.

| | |
|---|---|
| ***B60W 10/11*** | (2012.01) |
| ***B60W 20/30*** | (2016.01) |
| ***F16H 61/02*** | (2006.01) |
| ***F16H 59/42*** | (2006.01) |
| ***F16H 59/40*** | (2006.01) |
| ***F16H 59/24*** | (2006.01) |
| ***F16H 59/18*** | (2006.01) |
| ***F16H 37/08*** | (2006.01) |
| ***B60W 10/115*** | (2012.01) |
| ***B60W 10/101*** | (2012.01) |
| ***B60W 10/06*** | (2006.01) |
| ***F16H 63/50*** | (2006.01) |
| ***F16H 61/04*** | (2006.01) |
| ***F16H 3/66*** | (2006.01) |

(52) U.S. Cl.

CPC .......... *B60W 10/06* (2013.01); *B60W 10/101* (2013.01); *B60W 10/115* (2013.01); *B60W 20/30* (2013.01); *F16H 3/66* (2013.01); *F16H 37/0826* (2013.01); *F16H 59/18* (2013.01); *F16H 59/24* (2013.01); *F16H 59/40* (2013.01); *F16H 59/42* (2013.01); *F16H 61/0437* (2013.01); *F16H 63/50* (2013.01); *B60W 2510/0638* (2013.01); *B60W 2520/105* (2013.01); *B60W 2540/10* (2013.01); *F16H 2061/0216* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01)

(56) References Cited

U.S. PATENT DOCUMENTS

| | | | | |
|---|---|---|---|---|
| 2008/0153661 | A1* | 6/2008 | Shibata .................. | B60K 6/445 477/3 |
| 2008/0318727 | A1* | 12/2008 | Matsubara ............. | B60K 6/445 477/3 |
| 2009/0227417 | A1* | 9/2009 | Imamura ................ | B60K 6/445 477/5 |
| 2009/0229393 | A1* | 9/2009 | Shibata .................. | B60K 6/445 74/335 |
| 2017/0299053 | A1 | 10/2017 | Kobayashi et al. | |
| 2018/0354495 | A1* | 12/2018 | Kumazaki ............. | B60W 20/30 |
| 2019/0032774 | A1* | 1/2019 | Yoshikawa ......... | F16H 61/0213 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-153719 filed on Aug. 8, 2017, the disclosure of which is herein incorporated by reference in its entirety.

FIELD OF THE INVENTION

The present invention relates to a control apparatus for a vehicle provided with a step-variable transmission disposed between a drive power source and drive wheels, which control apparatus is configured to reduce a shifting shock of the step-variable transmission in the process of its shift-down action.

BACKGROUND OF THE INVENTION

There is well known a vehicle provided with a mechanically operated step-variable transmission disposed between a drive power source and drive wheels. JP-2006-9942A discloses an example of this type of vehicle. This vehicle is a hybrid vehicle provided with an engine, planetary gear sets functioning as a differential mechanism, and first and second electric motors operatively connected to rotary elements of the planetary gear sets in a power transmittable manner. JP-2006-9942A also discloses a technique for calculating output torques of the first and second electric motors on the basis of their electric current values, estimating an input torque of the step-variable transmission on the basis of the calculated output torques of the first and second electric motors, and controlling transient hydraulic pressures to be applied to coupling devices of the step-variable transmission to implement its shifting actions, on the basis of the estimated input torque.

By the way, a high rate of increase of an output (both of power and torque) of the drive power source in the process of a shift-down action of the step-variable transmission may cause an excessively or unnecessarily large amount of increase of the output to be transmitted to the step-variable transmission in an inertia phase of the shift-down action, giving rise to a risk of an excessively high rate of rise so-called "racing" of an input shaft speed of the step-variable transmission due to an excess of the output, and a consequent risk of generation of a shifting shock of the step-variable transmission. In view of these risks, a control apparatus for a hybrid vehicle as disclosed in JP-2006-9942A is configured to implement a regenerative control of the second electric motor, so as to absorb an excess of the output transmitted to the step-variable transmission, for thereby restricting the rate of rise of the input shaft speed to reduce the risk of its racing and the shifting shock of the step-variable transmission. However, when an amount of electric power that can be regenerated by the second electric motor is limited, for example, when a maximum amount of electric power that can be stored in a battery is relatively small, the excess of the output of the drive power source cannot be sufficiently absorbed by the regenerative control of the second electric motor, so that there is still a risk of generation of the shifting shock of the step-variable transmission.

SUMMARY OF THE INVENTION

The present invention was made in view of the background art described above. It is therefore an object of the present invention to provide a control apparatus for a vehicle provided with a step-variable transmission disposed between a drive power source and drive wheels, which control apparatus permits reduction of a shifting shock of the step-variable transmission in the process of its shift-down action even when a charging amount to a battery is limited.

The object indicated above is achieved according to the following modes of the present invention:

According to a first mode of the invention, there is provided a control apparatus for a vehicle provided with a drive power source, a step-variable transmission which is disposed in a power transmitting path between the drive power source and drive wheels and which includes a plurality of coupling devices, and a motor/generator which is disposed between the drive power source and the step-variable transmission in a power transmittable manner and which is operable to implement a regenerative operation, the control apparatus comprising a shifting delay control portion configured to delay a moment of generation of a shift-down command to implement a power-on shift-down action of the step-variable transmission, with respect to a moment of determination to implement the power-on shift-down action, for thereby reducing a shifting shock of the step-variable transmission in the process of the power-on shift-down action. The shifting delay control portion adjusts a delay time from the moment of determination to implement the power-on shift-down action to the moment of generation of the shift-down command, on the basis of at least one of: an output state of the drive power source; an inertia power required in the process of the power-on shift-down action: a consumption power to be consumed by the coupling devices during the shift-down action; and a state of a battery to and from which an electric power is respectively supplied from and to the motor/generator.

According to a second mode of the invention, the control apparatus according to the first mode of the invention further comprises a transmission shifting control portion configured to control a shifting action of the step-variable transmission, and is configured such that the shifting delay control portion determines whether there is a risk of generation of a shifting shock of the step-variable transmission when the moment of generation of the shift-down command is not delayed. The transmission shifting control portion is configured not to delay the moment of generation of the shift-down command when the shifting delay control portion determines that there is not the risk of generation of the shifting shock, and to delay the moment of generation of the shift-down command when the shifting delay control portion determines that there is the risk of generation of the shifting shock.

According to a third mode of the invention, the control apparatus according to the second mode of the invention is configured such that the shifting delay control portion determines that there is not the risk of generation of the shifting shock even when the moment of generation of the shift-down command is not delayed, while the drive power source is held at rest, and that there is the risk of generation of the shifting shock when the moment of generation of the shift-down command is not delayed, where a temperature of a working fluid flowing through a hydraulic control unit provided for controlling the step-variable transmission is lower than a predetermined threshold value.

According to a fourth mode of the invention, the control apparatus according to the first mode of the invention is configured such that the shifting delay control portion shortens the delay time with an increase of a maximum charging amount of the battery.

According to a fifth mode of the invention, the control apparatus according to the first mode of the invention is configured such that the shifting delay control portion shortens the delay time with an increase of a power of the drive power source at the moment of determination to implement the power-on shift-down action.

According to a sixth mode of the invention, the control apparatus according to the first mode of the invention is configured such that the shifting delay control portion shortens the delay time with a decrease of a power of the drive power source required after completion of the power-on shift-down action.

According to a seventh mode of the invention, the control apparatus according to the first mode of the invention is configured to control the vehicle which is provided with: an engine functioning as the drive power source; a first motor/generator; a differential mechanism comprising a first rotary element operatively connected to the engine in a power transmittable manner, a second rotary element operatively connected to the first motor/generator in a power transmittable manner, and a third rotary element operatively connected to an input shaft of the step-variable transmission in a power transmittable manner; and a second motor/generator which is operatively connected to the third rotary element in a power transmittable manner and which serves as the motor/generator operable to implement the regenerative operation.

The control apparatus according to the first mode of the invention is configured to delay the moment of generation of the shift-down command to implement the power-on shift-down action of the step-variable transmission with respect to the moment of determination to implement the power-on shift-down action, by the delay time which is adjusted on the basis of at least one of the output state of the drive power source, the inertia power, the consumption power, and the state of the battery to and from which the electric power is respectively supplied from and to the motor/generator. Accordingly, the shift-down action is performed under the condition where output of the drive power source is stable, and the risk of generation of the shifting shock of the step-variable transmission can be reduced. In this respect, it is noted that while the degree of reduction of the risk of generation of the shifting shock increases with an increase of the delay time from the moment of determination to implement the shift-down action to the moment of generation of the shift-down command, the degree of deterioration of the shifting control response increases with the increase of the delay time. In view of this, the control apparatus according to the present invention is configured such that the delay time is suitably adjusted on the basis of at least one of the output state of the drive power source, the inertia power, the consumption power and the state of the battery. Accordingly, the degree of deterioration of the shifting control response with the increase of the delay time can also be reduced. Thus, the delay time is suitably adjusted on the basis of at least one of the above-described output state of the drive power source, inertia power, consumption power and state of the battery to permit reduction of deterioration of the shifting control response while reducing the risk of generation of the shifting shock.

According to the second mode of the invention, it is possible to prevent an unnecessary delay of initiation of the shift-down action where it is determined that there is not a risk of generation of the shifting shock even if the moment of generation of the shift-down command is not delayed. Accordingly, the risk of deterioration of the shifting control response can be reduced while at the same time the risk of generation of the shifting shock can be reduced.

The control apparatus according to the third mode of the invention is configured to determine that there is not a risk of generation of the shifting shock even if the moment of generation of the shift-down command is not delayed, while the drive power source is held at rest, since a rate of increase of the output of the drive power source is not considerably increased even if the drive power source is started in the process of the shift-down action while the drive power source is held at rest. Further, the control apparatus is configured to determine that there is the risk of generation of the shifting shock if the moment of generation of the shift-down command is not delayed, while the temperature of the working fluid is lower than the predetermined threshold value, since the accuracy of control of the shift-down action is deteriorated while the working fluid temperature is lower than the threshold value. Thus, it is possible to estimate the risk of generation of the shifting shock where the moment of generation of the shift-down command is not delayed, depending upon whether the drive power source is held at rest, or on the basis of the working fluid temperature.

The fourth mode of the invention is based on a fact that an excess of the output of the drive power source generated in the process of the power-on shift-down action can be absorbed by a regenerative control of the motor/generator, by an amount which increases with an increase of the maximum charging amount of the battery, since an amount of regeneration of an electric power by the motor/generator can be increased with the increase of the maximum charging amount. Accordingly, the risk of generation of the shifting shock can be reduced even if the delay time is shortened with the increase of the maximum charging amount.

The fifth mode of the invention is based on a fact that the rate of increase of the power of the drive power source in the process of the power-on shift-down action is reduced with an increase of the power of the drive power source at the moment of determination to implement the power-on shift-down action. Accordingly, the risk of generation of the shifting shock can be reduced even if the delay time is shortened with the increase of the power of the drive power source.

The sixth mode of the invention is based on a fact that the rate of increase of the power of the drive power source in the process of the power-on shift-down action is reduced with a decrease of the power of the drive power source required after completion of the power-on shift-down action. Accordingly, the risk of generation of the shifting shock can be reduced even if the delay time is shortened with the decrease of the power of the drive power source after completion of the power-on shift-down action.

In the vehicle to be controlled according to the seventh mode of the invention, a drive force of the engine is distributed to the first motor/generator and the step-variable transmission, and a portion of the drive force transmitted to the step-variable transmission is absorbed by a regenerative control of the second motor/generator. Accordingly, a rate of rise of an input shaft speed of the step-variable transmission can be adequately controlled by the regenerative control of the second motor/generator during the power-on shift-down action. However, it is difficult to -restrict the rate of rise of the input shaft speed, resulting in a risk of generation of the shifting shock., where an amount of an electric power regenerated by the second motor/generator is limited due to limitation of the maximum charging amount of the battery as a result of an increase of an electric power amount stored in the battery. However, an adequate adjustment of the delay time from the moment of determination to implement the shift-down action according to the invention permits reduction of the risk of deterioration of the shifting control response due to an increase of the delay time, while reducing the risk of generation of the shifting shock.

DETAILED DESCRIPTION OF INVENTION

Figure 1:
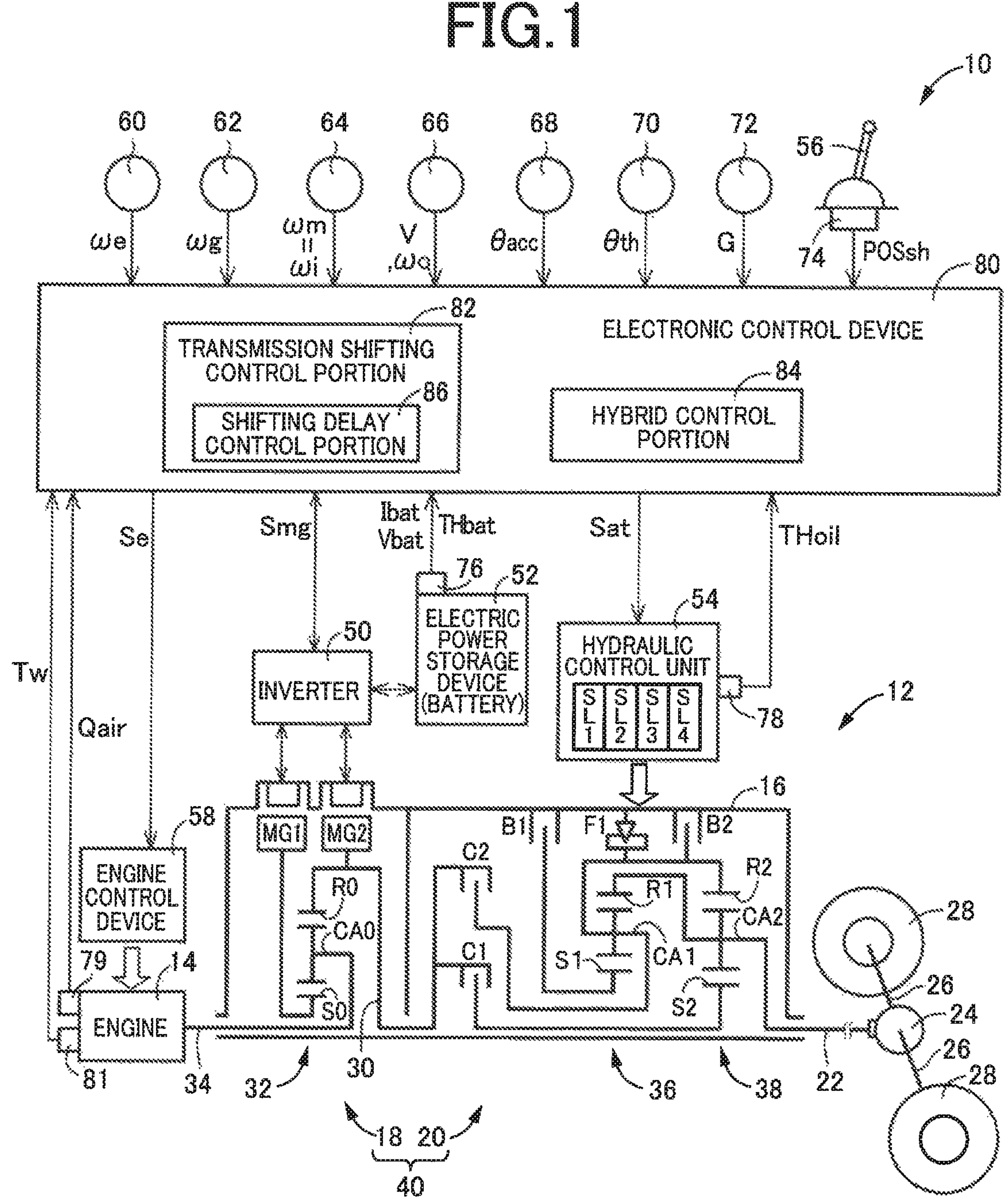
FIG. 1 is a schematic view showing an arrangement of one example of a vehicular drive system to be controlled by a control apparatus according to one embodiment of the present invention, and major control functions and control portions of the control apparatus.

The "shift-down command" described herein corresponds to hydraulic control commands to be applied to a hydraulic control unit provided to control hydraulic pressures of coupling devices of a step-variable transmission. That is, the shift-down action of the step-variable transmission is initiated when the hydraulic control commands (shift-down command) are applied to the hydraulic control unit.

The "power-on shift-down action" of the step-variable transmission described herein is interpreted to mean a shift-down action of the step-variable transmission which involves an increase of an output of a drive power source during the shift-down action as a result of a depressing operation of an accelerator pedal.

Referring to the drawings, preferred embodiments of the present invention will be described in detail. It is to be understood that the drawings are simplified and transformed as needed, and do not necessarily accurately represent dimensions and shapes of various elements of the embodiments.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission 18 (hereinafter referred to as "continuously variable transmission 18") connected directly or indirectly via a damper (not shown) or any other device to the engine 14, and a mechanically operated step-variable transmission 20 (hereinafter referred to as "step-variable transmission 20") connected to an output rotary member of the continuously variable transmission 18. The continuously variable transmission 18 and the step-variable transmission 20 are disposed in series with each other within a transmission casing 16 (hereinafter referred to as "casing 16") functioning as a non-rotatable member fixed to a vehicle body, such that the transmissions 18 and 20 are disposed coaxially with each other on a common axis. The vehicular drive system 12 is further provided with a differential gear mechanism 24 connected to an output rotary member of the step-variable transmission 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission 20, and is transmitted from the step-variable transmission 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission 18 and the step-variable transmission 20 are constructed substantially symmetrically with each other about the axis of the engine 14 (about the above-indicated common axis), and that FIG. 1 does not show the lower halves of the transmissions 18 and 20.

The engine 14 is the drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously variable transmission 18, without a fluid-operated type power transmitting device such as a torque converter or a fluid coupling being disposed between the engine 14 and the transmission 18. It is noted that the engine 14 is the drive power source of the vehicle 10 to be controlled by the control apparatus according to the present invention.

The continuously variable transmission 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission 18; and the second motor/generator MG2 operatively connected to the intermediate power transmitting member 30. The continuously variable transmission 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator.

In the continuously variable transmission 18, a drive force generated by the engine 14 is distributed to the first motor/generator MG1 and the intermediate power transmitting member 30. Further, a part or an entirety of an electric power generated by the first motor/generator MG1 is supplied to the second motor/generator MG2. The second motor/generator MG2 is operated with at least one of an electric power supplied from the first motor/generator MG1 and an electric power supplied from a battery 52, and a drive force generated by the second motor/generator MG2 is transmitted to the intermediate power transmitting member 30. The drive force transmitted to the intermediate power transmitting member 30 is received by the step-variable transmission 20. Thus, the vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is respectively supplied from and to the first motor/generator MG1 and the second motor/generator MG2. It is noted that the second motor/generator MG2 is a motor/generator of the present invention a regenerative operation of which is controllable.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission 20 is a mechanically operated transmission mechanism which constitutes a part of a power transmitting path between the intermediate power transmitting member 30 and the drive wheels 28. The intermediate power transmitting member 30 also functions as an input rotary member of the step-variable transmission 20. The step-variable transmission 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified), and which is shifted with engaging and releasing actions of the coupling devices CB.

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, after the engaging hydraulic pressure PRcb has been raised to initiate an engaging contact of the input and output elements with each other.

In the step-variable transmission 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission 20 is a step-variable automatic transmission which is shifted to a selected one of four gear positions (speed positions) by engaging actions of selected ones of the coupling devices CB. These four gear positions have respective different speed ratios γat (=input shaft speed ωi/output shaft speed ωo). Namely, the step-variable transmission 20 is a step-variable automatic transmission which is shifted up and down from one gear position to another by placing selected ones of the coupling devices CB in the engaged state. In the present embodiment, the gear positions of the step-variable transmission 20 are referred to as "AT gear positions". The input shaft speed ωi is a rotating speed (angular velocity) of the input shaft of the step-variable transmission 20, that is, a rotating speed of the intermediate power transmitting member 30, which is equal to an MG2 speed ωm which is an operating speed of the second motor/generator MG2, which is operatively connected to the step-variable transmission 20 in a power transmittable manner. Namely the input shaft speed ωi can be represented by the MG2 speed ωm. The output shaft speed ωo is a rotating speed of the output shaft 22 of the step-variable transmission 20, which is considered to be an output shaft speed of a transmission device 40 which consists of the continuously variable transmission 18 and the step-variable transmission 20.

Figures 2, 3:
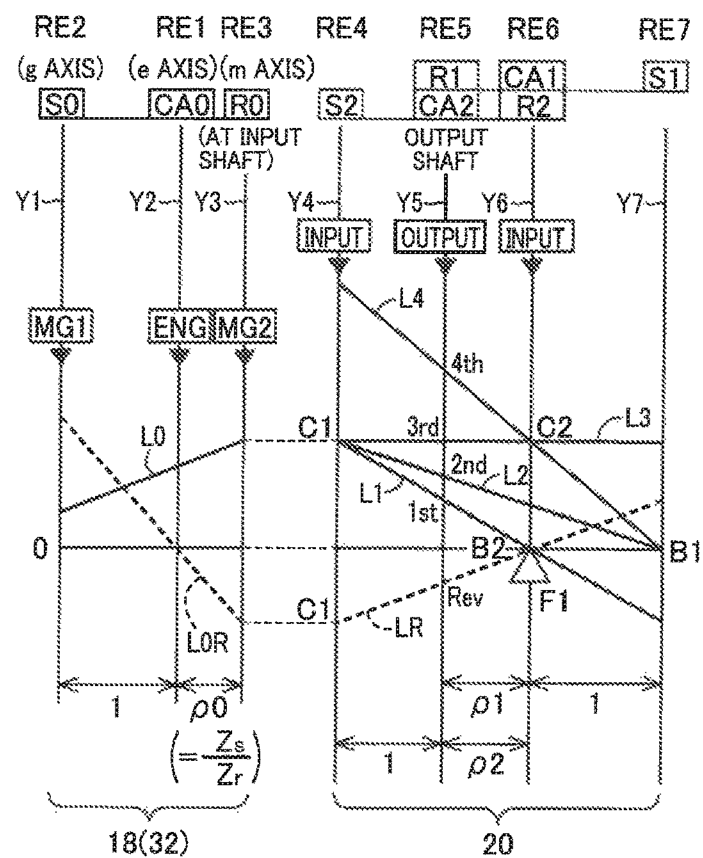
FIG. 2 is a table indicating a relationship between AT gear positions of a mechanically operated step-variable transmission shown in FIG. 1 and combinations of coupling devices placed in engaged states to establish the respective gear positions.
FIG. 3 is a collinear chart indicating a relationship among rotating speeds of rotary elements of an electrically controlled continuously variable transmission and the mechanically operated step-variable transmission.

Reference is now made to FIG. 2, which is the table indicating the relationship between the first, through fourth speed AT gear positions of the step-variable transmission 20 shown in FIG. 1 and combinations of the coupling devices CB placed in the engaged states to establish the respective AT gear positions. In the table, the four forward drive AT gear positions are respectively represented by "1$^{st}$", "2$^{nd}$", "3$^{rd}$" and "4$^{th}$". The first speed AT gear position "1$^{st}$" has a highest speed ratio γat, and the speed ratios γat of the four AT gear positions decrease in the direction from the first speed AT gear position (lowest-speed gear position) "1$^{st}$" toward the fourth speed AT gear position (highest-speed gear position) "4$^{th}$". In the table, "O" indicates the engaged state of the coupling devices CB, "Δ" indicates the engaged state of the coupling device B2 during application of an engine brake to the vehicle 10 or during a shift-down action of the step-variable transmission 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "1$^{st}$", so that the brake B2 is not required to be placed in the engaged state upon starting or acceleration of the vehicle 10. The above-indicated shift-down action of the step-variable transmission 20 in the coasting run of the vehicle 10 is a kind of a "power-off shift-down action" which is required as a result of reduction of a vehicle-speed-related value (vehicle running speed V, for example) due to reduction of a required drive force (as represented by an operation amount θacc of an accelerator pedal by a driver (operator) of the vehicle 10) or during deceleration of the vehicle 10 in a released or non-operated position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission 20 is placed in a neutral position (a power transmission cutoff state) when all of the coupling devices CB are placed in the released states.

The step-variable transmission 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission 20. The above-indicated one coupling device CB was placed in the engaged state before the step-variable transmission 20 is shifted to establish the newly selected AT gear position, while the above-indicated another coupling device CB is placed in the engaged state while the step-variable transmission 20 is placed in the newly selected AT gear position. Thus, the step-variable transmission 20 is shifted up or down from one of the AT gear positions to another by so-called "clutch-to-clutch" shifting operation, namely, concurrent releasing and engaging actions of the selected two coupling devices CB. For instance, the step-variable transmission 20 is shifted down from the second speed AT gear position "2$^{nd}$" to the first speed AT gear position "1$^{st}$", with the releasing action of the brake B1, that is an engaging device to be released during the shift-down, and the concurrent engaging action of the brake B2, that is an engaging device to be engaged during the shift-down, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission 18 and the step-variable transmission 20. In this collinear chart, three vertical lines Y1, Y2 and Y3 corresponding to the respective three rotary elements of the differential mechanism 32 of the continuously variable transmission 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input shaft rotating speed of the step-variable transmission 20). Further, four vertical lines Y4, Y5, Y6 and Y7 corresponding to the respective four rotary elements of the step-variable transmission 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission 18 is arranged such that the engine 14 (represented as "ENG" in the collinear chart) is operatively connected to the first rotary element RE1 in a power transmittable manner, and the first motor/generator MG1 (represented as "MG1" in the collinear chart) is operatively connected to the second rotary element RE2 in a power transmittable manner, while the second motor/generator MG2 (represented as "MG2" in the collinear chart) is operatively connected in a power transmittable manner to the third rotary element RE3 which is rotated together with the intermediate power transmitting member 30. Thus, a rotary motion of the engine 14 is transmitted to the step-variable transmission 20 through the intermediate power transmitting member 30. In a part of the collinear chart corresponding to the continuously variable transmission 18, straight lines L0 and L0R intersecting the vertical line Y2 represent a relationship between the rotating speeds of the sun gear S0 and the ring gear R0.

The step-variable transmission 20 is arranged such that the fourth rotary element RE4 is selectively connected to the intermediate power transmitting member 30 through the clutch C1, the fifth rotary element RE5 is connected to the output shaft 22, the sixth rotary element RE0 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission 20, straight lines L1, L2, L3, L4 and LR intersecting the vertical line Y5 represent the rotating speeds of the output shaft 22 in the respective first, second, third, fourth speed AT gear positions "1$^{st}$", "2$^{nd}$", "3$^{rd}$", "4$^{th}$" and reverse drive gear position "Rev" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td ($=Te/(1+\rho)=-(1/\rho)*Tg$) which is a positive torque is applied to the ring gear R0 and rotating the ring gear R0 in the positive direction. The vehicle 10 is driven in the forward direction with a vehicle drive torque (transmission input torque Ti) which is a sum of the directly transmitted engine torque Td and the MG2 torque Tm and which is transmitted to the drive wheels 28 through the step-variable transmission 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52. Thus, the input torque Ti transmitted to the step-variable transmission 20 is controlled by the first motor/generator MG1 and the second motor/generator MG2.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed ωe of the engine 14 (engine speed ωe) is kept zero, and the vehicle 10 is driven in the forward direction with the MG2 torque Tm (positive forward driving torque), which is transmitted as a forward drive torque to the drive wheels 28 through the step-variable transmission 20 placed in one of the first through fourth speed. AT gear positions.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission 20 placed in the first speed AT gear position. To drive the vehicle 10 in the rearward direction, the electronic control device 80 described below is configured to command the second motor/generator MG2 to generate the reverse driving MG2 torque Tm (negative reverse driving torque) opposite to the forward driving MG2 torque Tm (positive forward driving torque), while the step-variable transmission 20 is placed in a low-speed AT gear position (first speed AT gear position, for example). Thus, the vehicle 10 is driven in the rearward direction with the reverse (negative) MG2 torque Tm while the step-variable transmission 20 is placed in one of the forward drive AT gear positions. In the hybrid drive mode, too, the second motor/generator MG2 can be operated in the negative direction as indicated by the straight line L0R, so that the vehicle 10 can be driven in the rearward direction in the hybrid drive mode, as well as in the motor drive mode.

In the vehicular drive system 12, the continuously variable transmission 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, the second motor/generator MG2) is operatively connected. Namely, the continuously variable transmission 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission 18 is operated as an electrically controlled continuously variable transmission a speed ratio $\gamma 0$ (=ωe/ωm) of which is variable. The speed ratio $\gamma 0$ is a ratio of a rotating speed of the connecting shaft 34 (namely, engine speed ωe) to the rotating speed of the intermediate power transmitting member 30 (namely, MG2 speed ωm).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the step-variable transmission 20 placed in one of the AT gear positions, so that the rotating speed of the carrier CA0 (namely, engine speed ωe) is accordingly raised or lowered. In running with operation of the engine 14, therefore, the engine 14 can be operated at an efficient operating point. That is, the step-variable transmission 20 to be placed in a selected one of the AT gear positions and the continuously variable transmission 18 functioning as a continuously variable transmission cooperate to provide the transmission device 40 in which the continuously variable transmission 18 (differential mechanism 32) and the step-variable transmission 20 are disposed in series with each other and which functions as a continuously variable transmission as a whole.

Alternatively, the continuously variable transmission 18 can be shifted like a step-variable transmission. Accordingly, the transmission device 40 constituted by the step-variable transmission 20 to be placed in one of the AT gear positions and the continuously variable transmission 18 which can be shifted like the step-variable transmission can be shifted like a step-variable transmission as a whole. That is, the step-variable transmission 20 and the continuously variable transmission 18 can be controlled to selectively establish a plurality of speed positions (hereinafter referred to as "overall speed positions" although it may be referred also to as "conceptual speed positions") having respective different values of a speed ratio γt (=ωe/ωo) which is a ratio of the engine speed ωe to the output shaft speed ωo. The speed ratio γt is an overall speed ratio of the transmission device 40 consisting of the continuously variable transmission 18 and the step-variable transmission 20 which are disposed in series with each other. The overall speed ratio γt is equal to a product of the speed ratio $\gamma 0$ of the continuously variable transmission 18 and the speed ratio γat of the step-variable transmission 20, namely, $\gamma t = \gamma 0 * \gamma at$.

Figures 4, 5:
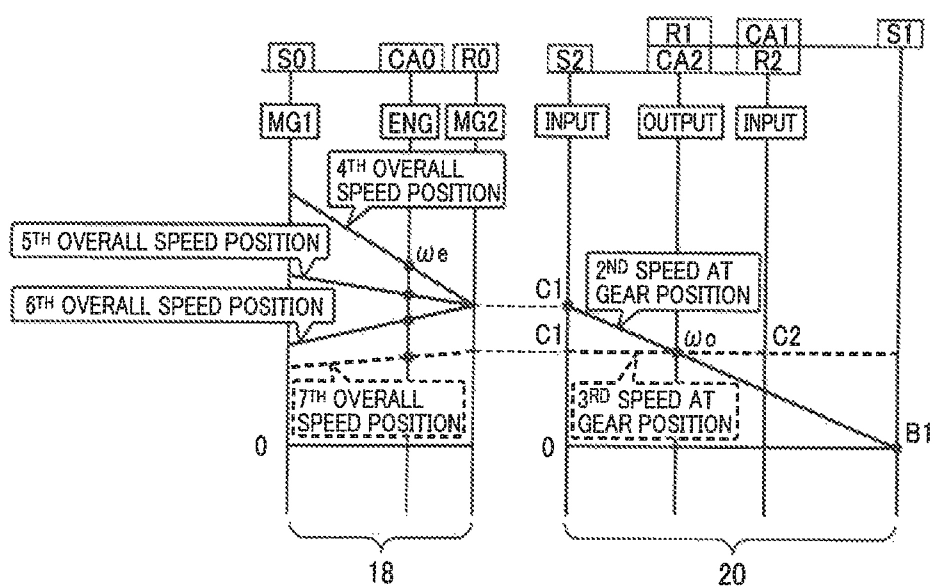
FIG. 4 is a table indicating an example of a plurality of overall speed positions of a transmission device in relation to the AT gear positions of the step-variable transmission.
FIG. 5 is a view indicating some examples of the AT gear positions of the step-variable transmission and some examples of the overall speed positions of the transmission device, on a collinear chart similar to that of FIG. 3.

At least one overall speed position is provided for each of the four AT gear positions of the step-variable transmission 20, with a combination of each AT gear position with at least one of the different speed ratio values $\gamma 0$ of the continuously variable transmission 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position.

FIG. 5 is the view indicating some examples of the AT gear positions of the step-variable transmission 20 and some examples of the overall speed positions of the transmission device 40, on a collinear chart similar to that of FIG. 3. In FIG. 5, solid lines indicate the fourth through sixth overall speed positions established when the step-variable transmission 20 is placed in the second speed AT gear position. In the transmission device 40, the continuously variable transmission 18 is controlled to control the engine speed ωe with respect to the output shaft speed ωo for establishing the predetermined overall speed ratio values γt, to thereby establish the different overall speed position or positions for each of the AT gear positions. A broken line indicates the seventh overall speed position established when the step-variable transmission 20 is placed in the third speed AT gear position. In the transmission device 40, the continuously variable transmission 18 is controlled according to the selected one of the AT gear positions, for shifting the transmission device 40 from one of the overall speed positions to another.

The vehicle 10 is provided with the control apparatus in the form of the electronic control device 80 configured to control various devices of the vehicle 10 such as the engine 14, continuously variable transmission 18 and step-variable transmission 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 is configured to receive various input signals from various sensors provided on the vehicle 10, such as: an output signal of an engine speed sensor 60 indicative of the engine speed ωe; an output signal of an MG1 speed sensor 62 indicative of the MG1 speed ωg which is the operating speed of the first motor/generator MG1; an output signal of an MG2 speed sensor 64 indicative of the MG2 speed ωm which is the input shaft speed ωi; an output signal of an output shaft speed sensor 66 indicative of the output shaft speed coo corresponding to the vehicle running speed V; an output signal of an accelerator pedal operation amount sensor 68 indicative of the operation amount θacc of a vehicle accelerating member in the form of the accelerator pedal, which operation amount θacc represents a degree of acceleration of the vehicle 10 required by the vehicle operator; an output signal of a throttle valve opening angle sensor 70 indicative of an angle θth of opening of an electronic throttle valve; an output signal of an acceleration (G) sensor 72 indicative of a longitudinal acceleration value G of the vehicle 10; an output signal of a shift position sensor 74 indicative of an operating position POSsh of a manually operated shifting member in the form of a shift, lever 56 provided on the vehicle 10; an output signal of a battery sensor 76 indicative of a temperature THbat, a charging/discharging electric current Ibat and a voltage Vbat of the battery 52; an output signal of an oil temperature sensor 78 indicative of a temperature THoil of a working fluid used for operating hydraulic actuators of the coupling devices CB; an output signal of an intake air quantity sensor 79 indicative of an intake air quantity Qair of the engine 14; and an output signal of a cooling water temperature sensor 81 indicative of a temperature Tw of a cooling water of the engine 14.

Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54 provided to control the operating states of the coupling devices CB (namely, for controlling the shifting actions of the step-variable transmission 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current as a hydraulic control command corresponding to the hydraulic pressure command value.

The electronic control device 80 is configured to calculate a charging state (stored electric power amount) SOC (%) of the battery 52 on the basis of the charging/discharging electric current Ibat and the voltage Vbat of the battery 52. The electronic control device 80 is further configured to calculate, based on, for example, the temperature THbat and the charging state SOC (stored electric power amount) of the battery 52, a maximum charging amount Win of electric power that can be further stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a transmission shifting control portion 82 functioning as shifting control means, and a hybrid control portion 84 functioning as hybrid control means, for performing various controls of the vehicle 10.

The transmission shifting control portion 82 is configured to determine a shifting action of the step-variable transmission 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission 20. The AT gear position shifting map is a predetermined relationship having shifting lines (shift-up boundary lines and shift-down boundary lines) used to determine whether the step-variable transmission 20 should be shifted up or down. These shifting lines are defined in a two-dimensional coordinate system in which the output shaft speed ωo (equivalent to the vehicle running speed V) and the accelerator pedal operation amount θacc (equivalent to a required drive torque Tdem or throttle valve opening angle θth) are taken as two variables along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command target value of an engine power Pe (engine output Pe) which is a power of the engine 14 (required engine power Pedem) outputting the engine torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and a command value of an electric power amount Wm to be consumed by the second motor/generator MG2 to generate the MG2 torque Tm at the present MG2 speed ωm. It is noted that the engine power Pe corresponds to a power of the drive power source, while the required engine power Pedem corresponds to a required power of the drive power source.

When the transmission device 40 as a whole is operated as the continuously variable transmission while the continuously variable transmission 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission 18 is controlled so as to be continuously varied. As a result, the speed ratio γt of the transmission device 40 is controlled while the continuously variable transmission 18 is operated as the continuously variable transmission.

When the transmission device 40 as a whole is operated as the step-variable transmission while the continuously variable transmission 18 is operated as the step-variable transmission, for instance, the hybrid control portion 84 determines a shifting action of the transmission device 40 according to an overall speed position shifting map, for example, and performs a shifting control of the continuously variable transmission 18 to establish a selected one of the plurality of overall speed positions, in cooperation with the transmission shifting control portion 82 to shift the step-variable transmission 20 selectively to the AT gear positions. The plurality of overall speed positions can be established by controlling the first motor/generator MG1 to control the engine speed ωe according to the output shaft speed ωo so as to maintain the respective speed ratio values γt. It is noted that the speed ratio γt in each of the overall speed positions does not necessarily have to be constant over all ranges of the output shaft speed ωo, but may be changed in a predetermined range or ranges of the output shaft speed ωo or may be given a limitation or limitations, for example, depending on upper and lower limits of rotating speeds of respective rotatable elements.

Figure 6:
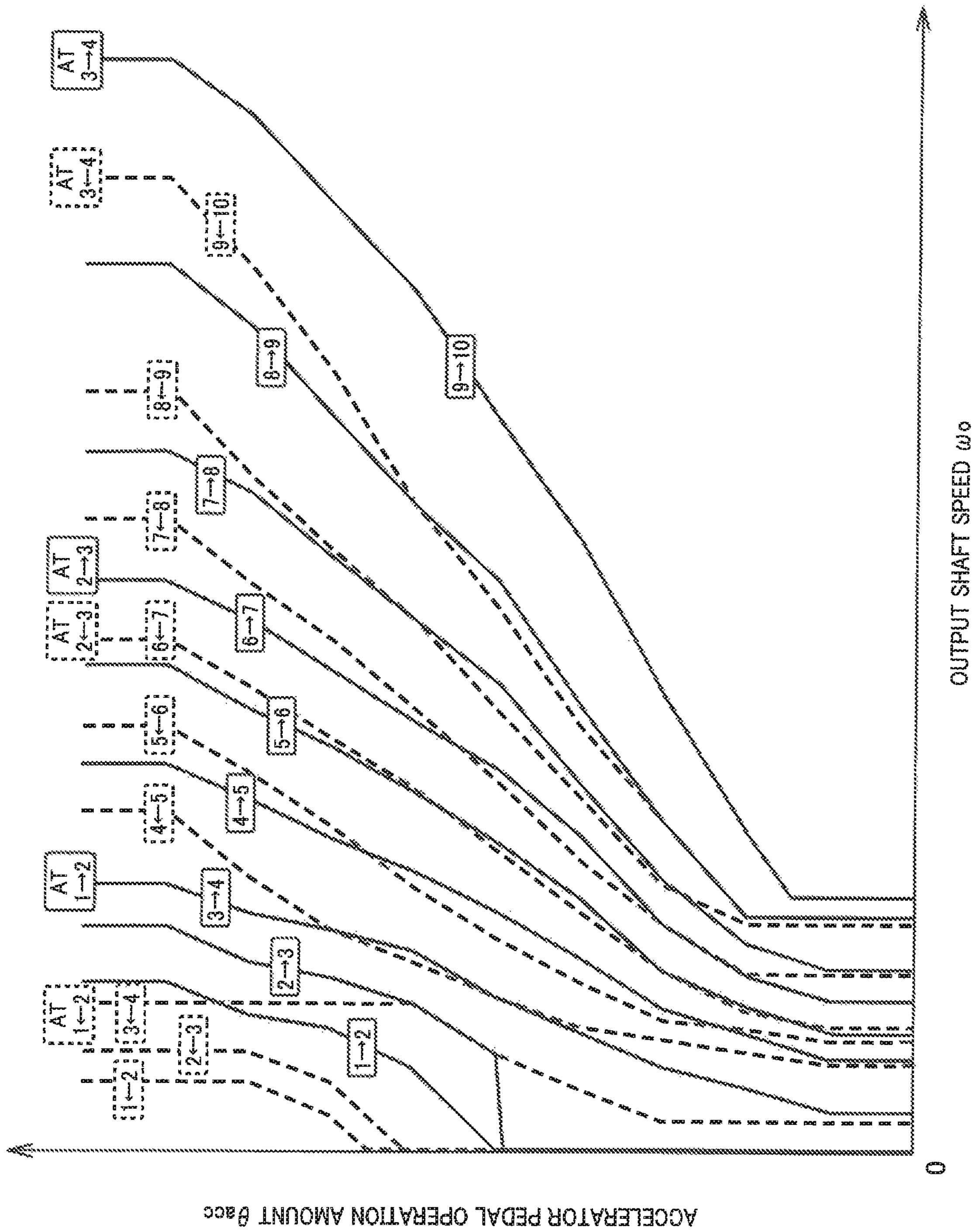
FIG. 6 is a view illustrating an example of an overall speed position shifting map used to shift the transmission device to a selected one of the plurality of overall speed positions.

The above-indicated overall speed position shifting map is a relationship between the output shaft speed coo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission 18 and the step-variable transmission 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission. 20 is shifted between the second speed AT gear position and the first speed AT gear position. When the transmission device 40 is shifted between the seventh overall speed position and the sixth overall speed position, the step-variable transmission 20 is shifted between the third speed AT gear position and the second speed AT gear position. When the transmission device 40 is shifted between the tenth overall speed position and the ninth overall speed position, the step-variable transmission 20 is shifted between the fourth speed AT gear position and the third speed AT gear position. In this respect, reference is made to FIG. 4.

Therefore, the AT gear position shifting map of FIG. 6 is formulated so that the AT gear position shifting operation is performed in synchronization with the overall speed position shifting operation. Described more specifically by reference to FIG. 6, the shift-up boundary lines for respectively shifting the transmission device 40 from the third overall speed position to the fourth overall speed position, from the sixth overall speed position to the seventh overall speed position, and from the ninth overall speed position to the tenth overall speed position coincide with the shift-up boundary lines for respectively shifting the step-variable transmission 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, the shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission 20 from the second speed AT gear position to the first speed AT gear position (indicated as "AT1←2" in FIG. 6), from the third speed AT gear position to the second speed AT gear position, and from the fourth speed AT gear position to the third speed AT gear position.

Alternatively, a command to shift the step-variable transmission 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission 20, and a shift-down action of the transmission device 40 as a whole takes place upon a shift-down action of the step-variable transmission 20. The transmission shifting control portion 82 commands the step-variable transmission 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission 20 is performed with a change of the engine speed ωe, so that the vehicle operator is less likely to uncomfortably recognize a shifting shock of the step-variable transmission 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

The transmission shifting control portion 82 implements a shift-down action of the step-variable transmission 20, when a determination to implement the shift-down action is made upon determination that a point indicative of a running state of the vehicle 10 has moved across any one of the shift-down boundary lines in the AT gear position shifting map, as a result of a depressing operation of the accelerator pedal. A power-on shift-down action of the step-variable transmission 20 to be implemented as a result of the depressing operation of the accelerator pedal causing an increase of the engine power Pe is controlled primarily by regulating a releasing hydraulic pressure Poff of the releasing-side coupling device CB to be brought into its released state to implement the power-on shift-down action.

By the way, the engine power Pe may be excessively or unnecessarily increased in the process of a power-on shift-down action of the step-variable transmission 20 which involves an increase of the engine power Pe, if a shift-down command to implement the power-on shift-down action is generated simultaneously or substantially simultaneously with a moment of determination to implement the power-on shift-down action, in order to improve the shifting control response of the step-variable transmission 20. An excess of the engine power Pe may cause high rates of rise of the engine speed ωe and the input shaft speed ωi of the step-variable transmission 20 in an inertia phase of the power-on shift-down action, giving rise to a risk of racing the input shaft speed ωi, and a consequent risk of generation of a shifting shock of the step-variable transmission 20. In view of these risks, the electronic control device 80 provided for the vehicle 10 is configured to implement a regenerative control of the second motor/generator MG2, so as to absorb the excess of the engine power Pe, for thereby reducing the risk of generation of the shifting shock of the step-variable transmission 20. However, when the amount of electric power Pbat (more specifically, the maximum charging amount Win) of the battery 52 is comparatively small, that is, receivable amount is limited, the excess of the large engine power Pe cannot be sufficiently absorbed in the process of the power-on shift-down action by the regenerative control of the second motor/generator MG2, so that there is still a risk of generation of the shifting shock of the step-variable transmission 20.

To reduce the risk of generation of the shifting shock of the step-variable transmission 20 in the process of its power-on shift-down action (hereinafter referred to simply as "shift-down action"), the electronic control device 80 includes a shifting delay control portion 86 configured to delay a moment of generation of the shift-down command to implement the shift-down action, with respect to the moment of determination to implement the shift-down action, by a delay time Tdelay. Namely, the shifting delay control portion 86 applies the shift-down command to the hydraulic control unit 54 when the delay time Tdelay has elapsed after the moment of determination to implement the shift-down action, so that the shift-down action of the step-variable transmission 20 is initiated when the delay time Tdelay has elapsed after the moment of determination to implement the shift-down action. Accordingly, the engine power Pe is more stabilized in the inertia phase of the shift-down action (namely, the rate of increase of the engine power Pe is made lower), than where the delay time Tdelay is not set prior to the moment of initiation of the shift-down action, so that the risk of generation of racing of the input shaft speed ωi due to high rates of rise of the engine speed ωe and input shaft speed ωi is restricted to reduce the risk of generation of the shifting shock of the step-variable transmission 20.

In this respect, it is noted that there is a risk of deterioration of the shifting control response (so-called "shifting hesitation") of the step-variable transmission 20 if the delay time Tdelay is unnecessarily long, since the moment of initiation of the shift-down action is delayed as the delay time Tdelay is increased, although the shifting shock is reduced with an increase of the delay time Tdelay. In view of this, the shifting delay control portion 86 is configured to adjust the delay time Tdelay on the basis of suitably selected parameters described below, such that the delay time Tdelay is held within a predetermined range in which the risk of deterioration of the shifting control response is minimized while at the same time the shifting shock is not substantially generated, so that the risk of deterioration of the shifting control response can be reduced as well as the risk of generation of the shifting shock can be reduced. There will be described a method of determination or adjustment of the delay time Tdelay by the shifting delay control portion 86.

The shifting delay control portion 86 adjusts the delay time Tdelay prior to the moment of generation of the shift-down command to implement the shift-down action, on the basis of at least one of: the engine power Pe at the moment of determination to implement the shift-down action; the required engine power Pedem after completion of the shift-down action; a consumption power Pcb to be consumed by those of the coupling devices CB of the step-variable transmission 20, the operating states of which are switched to implement the shift-down action; an inertia power. Pinert required in the process of the shift-down action (in its inertia phase, in particular); and the maximum charging amount Win of the battery 52. It is noted that the engine power Pe and the required engine power Pedem correspond to an output state of the drive power source, while the maximum charging amount Win of the battery 52 corresponds to a state of the battery.

The engine power Pe can be obtained on the basis of the accelerator pedal operation amount θacc and the engine speed ωe, and according to a known relationship map representative of a relationship between the engine power Pe, and the accelerator pedal operation amount θacc and the engine speed ωe. It is considered that the rate of increase of the engine power Pe in the process of the shift-down action is lower when the engine power Pe at the moment of determination to implement the shift-down action is comparatively large than when the engine power Pe is comparatively small. Accordingly, the rate of increase of the engine power Pe in the process of the shift-down action is comparatively low and the degree of the shifting shock is smaller, when the engine power Pe is comparatively large than when the engine power Pe is comparatively small.

Therefore, there is a relatively low risk of generation of the shifting shock even where the delay time Tdelay is relatively shorter, when the engine power Pe at the moment of determination to implement the shift-down action is comparatively large than when the engine power Pe is comparatively small. Accordingly, the delay time Tdelay can be shortened with an increase of the engine power Pe at the moment of determination to implement the shift-down action.

The required engine power Pedem after completion of the shift-down action can be obtained on the basis of the accelerator pedal operation amount θacc and a target speed Ne* of the engine 14 after completion of the shift-down action. It is considered that the rate of increase of the engine power Pe in the process of the shift-down action is lower when the required engine power Pedem after completion of the shift-down action is comparatively small than when the required engine power Pedem is comparatively large. Accordingly, the degree of the shifting shock is smaller when the required engine power Pedem is comparatively small and the rate of increase of the engine power Pe in the process of the shift-down action is comparatively low, than when the required engine power Pedem is comparatively large.

Therefore, there is a relatively low risk of generation of the shifting shock even where the delay time Tdelay is relatively shorter, when the required engine power Pedem after completion of the shift-down action is comparatively small than when the required engine power Pedem is comparatively large. Accordingly, the delay time Tdelay can be shortened with a decrease of the required engine power Pedem after completion of the shift-down action.

The consumption power Pcb of the coupling devices CB in the process of the shift-down action is an electric power consumed primarily as a result of generation of heat due to friction of the coupling devices CB in their slipping states. The consumption power Pcb has a correlation with commanded values of hydraulic pressures to be applied to those coupling devices CB. These commanded hydraulic pressure values are changed according to a relevant shifting pattern (AT gear positions before and after the shift-down action), the vehicle running speed V, the accelerator pedal operation amount θacc and the working fluid temperature THoil. That is, the consumption power Pcb can be estimated on the basis of the relevant shifting pattern, the vehicle running speed V, the accelerator pedal operation amount θacc and the working fluid temperature THoil. Accordingly, the consumption power Pcb can be estimated or obtained on the basis of predetermined parameters including the relevant shifting pattern, the vehicle running speed V, the accelerator pedal operation amount θacc and the working fluid temperature THoil, and according to a stored predetermined relationship map representative of a relationship between the consumption power Pcb and the above-indicated parameters.

While the engine power Pe increases in the process of the shift-down action, a portion of the engine power Pe which is consumed by the consumption power Pcb is larger when the consumption power Pcb is comparatively large than when the consumption power Pcb is comparatively small. Accordingly, the portion of the engine power Pe consumed in the process of the shift-down action is comparatively large, that is, the amount of consumption of the engine power Pe excessively increased in the process of the shift-down action is comparatively large, when the consumption power Pcb is comparatively large than when the consumption power Pcb is comparatively small, and therefore the degree of the shifting shock is smaller.

Therefore, there is a relatively low risk of generation of the shifting shock even where the delay time Tdelay is relatively shorter, when the consumption power Pcb in the process of the shift-down action is comparatively large than when the consumption power Pcb is comparatively small. Accordingly, the delay time Tdelay can be shortened with an increase of the consumption power Pcb in the process of the shift-down action.

The inertia power Pinert required in the process of the shift-down action has a correlation with a target rate of rise αe (namely, a target angular acceleration value αe) of the engine speed ωe in the process of the shift-down action, and a target rate of rise αi (namely, a target angular acceleration value αi) of the input shaft speed ωi. These rates of rise αe and αi are changed according to the AT gear positions before and after the shift-down action, the target engine speed ωe* after the shift-down action, the target input shaft speed ωi* after the shift-down action, the vehicle running speed V and the accelerator pedal operation amount θacc. That is, the inertia power Pinert can be estimated on the basis of to the AT gear positions before and after the shift-down action, the target engine speed ωe* after the shift-down action, the target input shaft speed ωi* after the shift-down action, the vehicle running speed V and the accelerator pedal operation amount θacc. Accordingly, the inertia power Pinert required in the process of the shift-down action can be estimated or obtained on the basis of predetermined parameters including the AT gear positions before and after the shift-down action, the target engine speed ωe* after the shift-down action, the target input shaft speed ωi* after the shift-down action, the vehicle running speed V and the accelerator pedal operation amount θacc, and according to a stored predetermined relationship map representative of a relationship between the inertia power Pinert and the above-indicated parameters.

While the engine power Pe increases in the process of the shift-down action, a portion of the engine power Pe which is consumed by the inertia power Pinert is larger when the inertia power Pinert is comparatively large than when the inertia power Pinert is comparatively small. Accordingly, the portion of the engine power Pe consumed in the process of the shift-down action is comparatively large, that is, the amount of consumption of the engine power. Pe excessively increased in the process of the shift-down action is comparatively large, when the inertia power Pinert is comparatively large than when the inertia power Pinert is comparatively small, and therefore the degree of the shifting shock is smaller.

Therefore, there is a relatively low risk of generation of the shifting shock even where the delay time Tdelay is relatively shorter, when the inertia power Pinert in the process of the shift-down action is comparatively large than when the inertia power Pinert is comparatively small. Accordingly, the delay time Tdelay can be shortened with an increase of the inertia power Pinert in the process of the shift-down action.

The maximum charging amount Win of the battery 52 is determined on the basis of its temperature THbat and charging state SOC. Further, the amount of regeneration of an electric power by the second motor/generator MG2 can be made larger when the maximum charging amount Win at the moment of determination to implement the shift-down action is comparatively large than when the maximum charging amount Win is comparatively small. Accordingly, the amount of absorption of the excess of the increased engine power Pe by the regenerative control of the second motor/generator MG2 can be made larger when the maximum charging amount Win is comparatively large. Namely, the amount of absorption of the excess of the increased engine power Pe is comparatively large when the maximum charging amount Win at the moment of determination to implement the shift-down action is comparatively large than when the maximum charging amount Win is comparatively small, and therefore the degree of the shifting shock can be made smaller.

Therefore, there is a relatively low risk of generation of the shifting shock even where the delay time Tdelay is relatively shorter, when the maximum charging amount Win of the battery 52 at the moment of determination to implement the shift-down action is comparatively large than when the maximum charging amount Win comparatively small. Accordingly, the delay time Tdelay can be shortened with an increase of the maximum charging amount Win of the battery 52 at the moment of determination to implement the shift-down action.

The shifting delay control portion 86 adequately adjusts the delay time Tdelay, according to at least one of: a relationship between the delay time Tdelay and the engine power Pe at the moment of determination to implement the shift-down action; a relationship between the delay time Tdelay and the required engine power Pedem after completion of the shift-down action; a relationship between the delay time Tdelay and the consumption power Pcb of the coupling devices CB of the step-variable transmission 20 the operating states of which are switched to implement the shift-down action; a relationship between the delay time Tdelay and the inertia power Pinert required in the process of the shift-down action; and a relationship between the delay time Tdelay and the maximum charging amount Win of the battery 52. The delay time Tdelay and the above-indicated parameters Pe, Pedem, Pcb, Pinert and Win used to adjust the delay time Tdelay are calculated at the moment of determination to implement the shift-down action.

The shifting delay control portion 86 stores at least one relationship map used to adjust or obtain the delay time Tdelay on the basis of at least one of the above-indicated parameters, that is, at least one of the engine power Pe, the required engine power Pedem, the consumption power Pcb, the inertia power Pinert and the maximum charging amount Win. The relationship maps are obtained by experimentation or theoretical analysis, and are equivalent to the above-indicated relationships between the delay time Tdelay and the various parameters. The relationship maps are formulated such that the delay time Tdelay may be zero in some cases. For instance, the delay time Tdelay is set to be zero, when the maximum charging amount Win is sufficiently large so that the excess of the engine power Pe generated in the process of the shift-down action can be absorbed by the regenerative control of the second motor/generator MG2.

The shifting delay control portion 86 may use or store a plurality of relationship maps, as well as only one relationship map. For example, the shifting delay control portion 86 may store five relationship maps corresponding to the respective five parameters Pe, Pedem, Pcb, Pinert and Win, and select at least one of those relationship maps to obtain the delay time Tdelay, depending upon the running condition of the vehicle 10.

Further, selected at least one of the parameters may be given priority in determination of the delay time Tdelay, so that the delay time Tdelay is determined primarily on the basis of the priority parameter or parameters, and in additional consideration of the other parameter or parameters. Described more specifically, where the maximum charging amount Win is given priority, the relationship maps are provided for respective different regions within an entire range of the maximum charging amount Win. At least one of the relationship maps is selected depending upon the specific value of the maximum charging amount Win, and the delay time Tdelay is determined according to the selected relationship map. In this case, the selected relationship map corresponds to the parameter other than the maximum charging amount Win. Like the relationship between the delay time Tdelay and the maximum charging amount Win, the relationship map corresponding to a comparatively large value one of the regions of the maximum charging amount Win is formulated such that the delay time Tdelay is determined to be shorter, than the relationship map corresponding to a comparatively small value one of the regions of the maximum charging amount Win. For instance, the parameter such as the engine power Pe other than the maximum charging amount Win may be given priority in determination of the delay time Tdelay.

Further, at least one of the relationship maps may be selected depending upon the specific values of two or more parameters such as the engine power Pe and the maximum charging amount Win. In this case, the relationship maps are provided for respective different regions within entire ranges of the engine power Pe and the maximum charging amount Win. One of the relationship maps is selected depending upon the specific values of the engine power Pe and the maximum charging amount Win, and the delay time Tdelay is determined according to the selected relationship map. In this case, the selected relationship map corresponds to the parameter other than the engine power Pe and the maximum charging amount Win. Further, the relationship map corresponding to a comparatively large value one of the regions of the maximum charging amount Win is formulated such that the delay time Tdelay is determined to be shorter, than the relationship map corresponding to a comparatively small value one of the regions of the maximum charging amount Win. Similarly, the relationship map corresponding to the region of a comparatively large value of the engine power Pe is formulated such that the delay time Tdelay is determined to be shorter, than the relationship map corresponding to the region of a comparatively small value of the engine power Pe. At least one of the relationship maps may be selected on the basis of the parameters other than the engine power Pe and the maximum charging amount Win.

Where controllability of the engaging hydraulic pressure PRcb of the relevant coupling device CB is low due to an extremely low value of the working fluid temperature THoil, for instance, the accuracy of determination or adjustment of the delay time Tdelay is also low. In a running condition of the vehicle 10 in which it is estimated that the accuracy of determination of the delay time Tdelay is comparatively low, the delay time Tdelay may be made longer than in a running state of the vehicle 10 in which the accuracy of determination is comparatively high, so that the rate of increase of the engine power Pe is lowered to reduce the risk of generation of the shifting shock of the step-variable transmission 20. A determination as to whether the vehicle 10 is in the running condition in which it is estimated that the accuracy of determination of the delay time Tdelay is low is made depending upon whether the working fluid temperature THoil is lower than a predetermined lower limit or not, for instance.

The relationship maps may use various parameters other than those described above, for example, various values relating to the above-described parameters.

Figure 7:
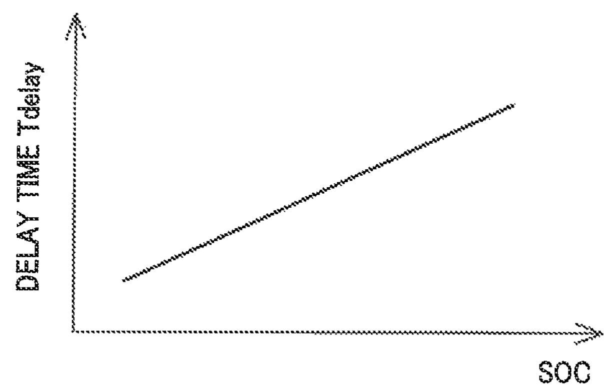
FIG. 7 is a view showing an example of a relationship map used to obtain a delay time on the basis of an electric power amount stored in a battery.

For example, the stored electric power amount SOC relates to the maximum charging amount Win. Accordingly, the delay time Tdelay may be determined according to a relationship map representative of a relationship between the delay time Tdelay and the stored electric power amount SOC which relates to the maximum charging amount Win. FIG. 7 is the view showing one example of this relationship map representative of the relationship between the delay time Tdelay and the stored electric power amount SOC. An amount of the engine power Pe increasing in the process of the shift-down action of the step-variable transmission 20, which amount can be absorbed, decreases with a decrease of the maximum charging amount Win which decreases with an increase of the stored electric power amount SOC. Accordingly, the relationship map of FIG. 7 is formulated such that the delay time Tdelay is prolonged with an increase of the stored electric power amount SOC, in order to reduce the risk of generation of the shifting shock. Thus, the delay time Tdelay may be determined on the basis of the stored electric power amount SOC relating to the maximum charging amount Win, and according to the relationship map representative of the relationship between the delay time Tdelay and the stored electric power amount SOC.

Figure 8:
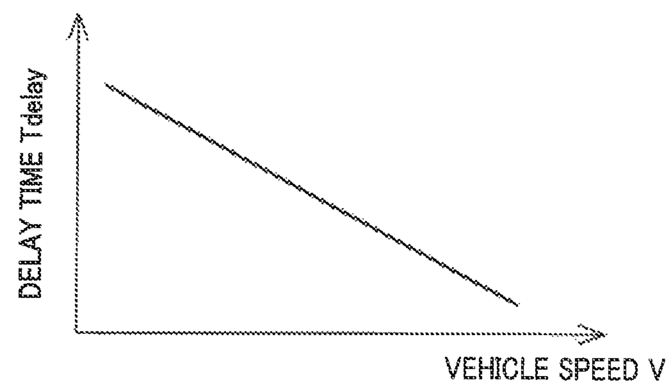
FIG. 8 is a view showing an example of a relationship map used to obtain the delay time on the basis of a running speed of the vehicle.

Further, the vehicle running speed V relates to the inertia power Pinert. Accordingly, the delay time Tdelay may be determined according to a relationship map representative of a relationship between the delay time Tdelay and the vehicle running speed V which relates to the inertia power Pinert. FIG. 8 is the view showing one example of this relationship map representative of the relationship between the delay time Tdelay and the vehicle running speed V. The inertia power Pinert required in the process of the shift-down action of the step-variable transmission 20 increases with amounts of change of the engine speed ωe and the input shaft speed of between before and after the shift-down action, which increase with an increase of the vehicle running speed V. As a result, an amount of the engine power Pe increasing in the process of the shift-down action, which amount can be consumed, increases with an increase of the vehicle running speed V. Accordingly, the relationship map of FIG. 8 is formulated such that the delay time Tdelay is shortened with an increase of the vehicle running speed V. Thus, the delay time Tdelay may be determined on the basis of the vehicle running speed V relating to the inertia power Pinert, and according to the relationship map representative of the relationship between the delay time Tdelay and the vehicle running speed V.

The shifting delay control portion 86 determines the delay time Tdelay according to selected at least one of the relationship maps described above, and determines whether the determined delay time Tdelay has elapsed after the moment of determination to implement the shift-down action of the step-variable transmission 20. When the shifting delay control portion 86 has determined that the delay time Tdelay has elapsed after the moment of determination to implement the shift-down action, the shifting delay control portion 86 commands the transmission shifting control portion 82 to apply the shift-down command in the form of the hydraulic control command signals Sat to the hydraulic control unit 54. As a result, the transmission shifting control portion 82 initiates a shift-down control to implement the shift-down action of the step-variable transmission 20, upon elapsing of the delay time Tdelay after the moment of determination to implement the shift-down action. Thus, the moment of generation of the shift-down command is delayed by the delay time Tdelay after the moment of determination to implement the shift-down action, so that the rates of rise of the engine speed we and the input shaft speed ωi are restricted, whereby the power-on shift-down action is implemented with reduced risks of generation of racing of the input shaft speed ωi and generation of the shifting shock. Further, the delay time Tdelay is adjusted on the basis of the various parameters, so as to be shorter than an upper limit below which the step-variable transmission 20 does not suffer from a considerable shifting shock and the shifting control response of the step-variable transmission 20 is not considerably deteriorated.

Figure 9:
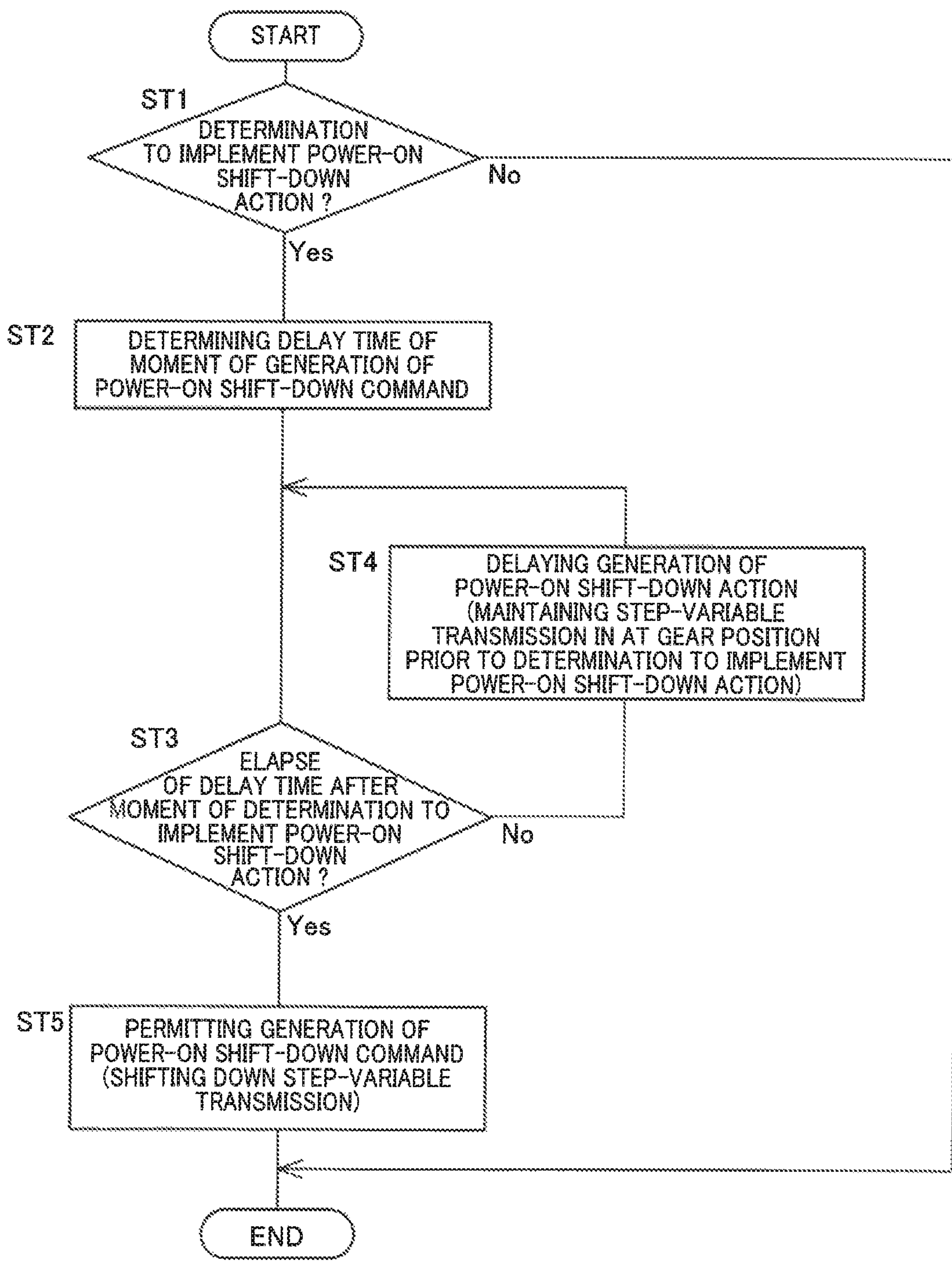
FIG. 9 is a flow chart illustrating an essential part of a control routine executed by the control apparatus in the form of an electronic control device shown in FIG. 1, namely, a control operation implemented so as to reduce a risk of generation of a shifting shock of the step-variable transmission in the process of its power-on shift-down action, and a risk of deterioration of a shifting control response of the step-variable transmission.

FIG. 9 is the flow chart illustrating an essential part of a control routine executed by the electronic control device 80, namely, a control operation implemented so as to reduce the risk of generation of the shifting shock of the step-variable transmission 20 in the process of its power-on shift-down action, and the risk of deterioration of the shifting control response of the step-variable transmission 20. This control operation is repeatedly performed during running of the vehicle 10.

The control operation is initiated with a step ST1 corresponding to a function of the transmission shifting control portion 82, to determine whether a determination to implement a power-on shift-down action of the step-variable transmission 20 has been made or not. If a negative determination is obtained in the step ST1, one cycle of execution of this control routine is terminated. If an affirmative determination is obtained in the step ST1, the control flow goes to a step ST2 corresponding to a function of the shifting delay control portion 86, to determine the delay time Tdelay on the basis of the various parameters, such that the delay time Tdelay is shorter than the upper limit below which the shifting control response of the step-variable transmission 20 is not considerably deteriorated as well as the risk of shifting shock is reduced.

The step ST2 is followed by a step ST3 also corresponding to the function of the shifting delay control portion 86, to determine whether the delay time Tdelay determined in the step ST2 has elapsed after the moment of determination to implement the shift-down action. If a negative determination is obtained in the step ST3, the control flow goes to a step ST4 corresponding to the functions of the transmission shifting control portion 82 and the shifting delay control portion 86, to delay the moment of generation of the shift-down command and maintain the step-variable transmission 20 in the AT gear position prior to the determination to implement the shift-down action. The steps ST3 and ST4 are repeatedly implemented until an affirmative determination is obtained in the step ST3.

If the affirmative determination is obtained in the step ST3, the control flow goes to a step ST5 corresponding to the functions of the transmission shifting control portion 82 and the shifting delay control portion 86, to generate the shift-down command for initiating the shift-down action of the step-variable transmission 20. Thus, the moment of initiation of the shift-down action of the step-variable transmission 20 is delayed by the delay time Tdelay, so that the risk of generation of the shifting shock in the process of the shift-down action of the step-variable transmission 20 is reduced. Further, the delay time Tdelay is adjusted on the basis of the various parameters, to be shorter than the upper limit below which the step-variable transmission 20 does not suffer from a considerable shifting shock and the shifting control response of the step-variable transmission 20 is not considerably deteriorated.

Figure 10:
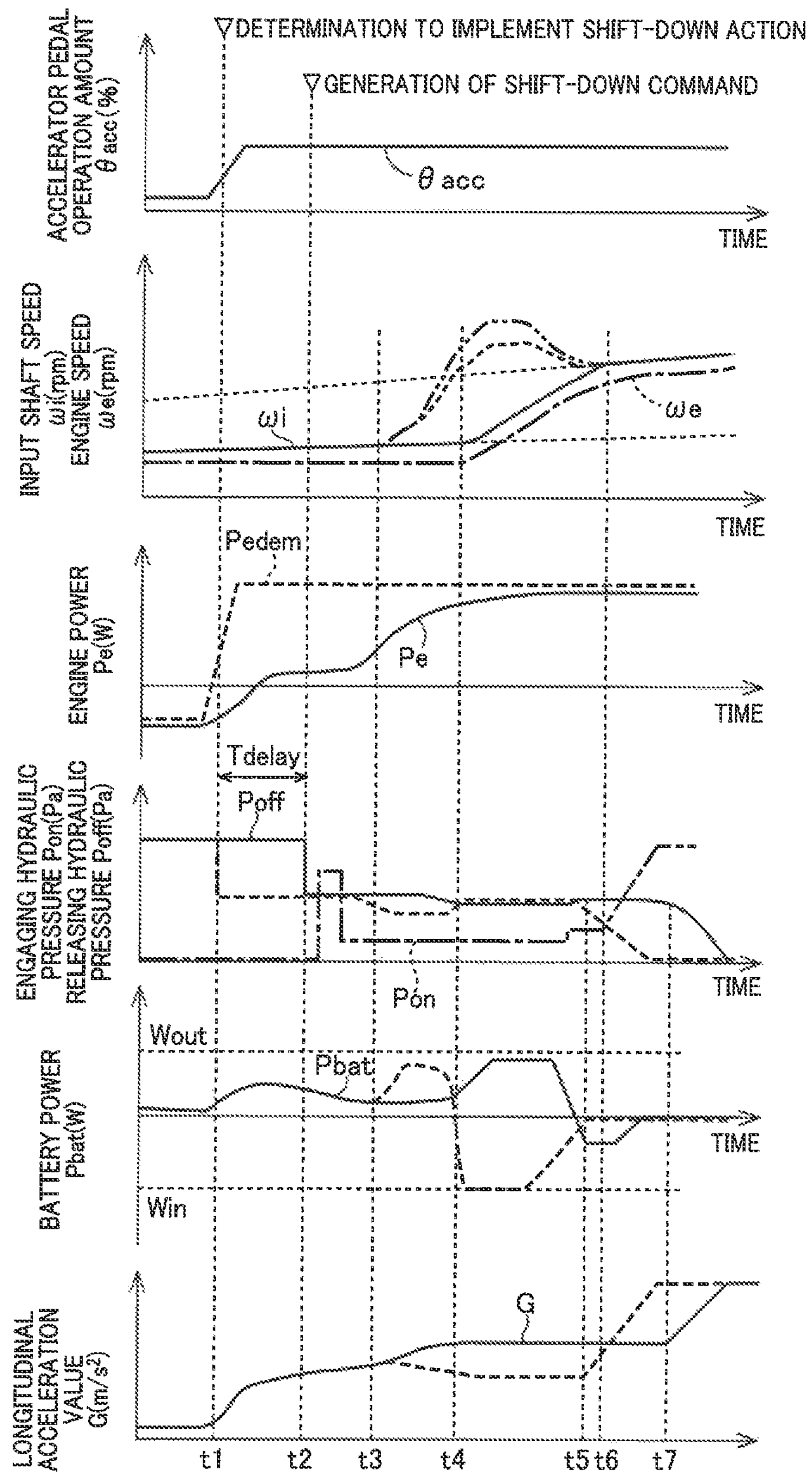
FIG. 10 is a time chart showing an example of changes of various parameters when the control operation illustrated in the flow chart of FIG. 9 is performed.

FIG. 10 is the time chart showing an example of changes of various parameters when the control operation illustrated in the flow chart of FIG. 9 is performed. The time chart of FIG. 10 shows the changes of the various parameters where the risk of generation of the shifting shock of the step-variable transmission 20 cannot be reduced only by the regenerative control of the second motor/generator MG2. In the time chart of FIG. 10, the time is taken along the horizontal axis, while the following parameters are taken along the vertical axis, in the order of description: the accelerator pedal operation amount θacc; the input shaft speed ωi and the engine speed ωe, the engine power Pe; an engaging hydraulic pressure Pon (commanded value) of the engaging-side coupling device CB and a releasing hydraulic pressure Poff (commanded value) of the releasing-side coupling device CB; the battery power Pbat; and the vehicle longitudinal acceleration value G. In FIG. 10, "t1" represents a moment at which the determination to implement the shift-down action of the step-variable transmission 20 is made, and "t2" represents a moment at which the shift-down command to implement the shift-down action is generated (the hydraulic control command signals Sat are generated). Further, "t4" represents a moment of initiation of an inertia phase of the shift-down action of the step-variable transmission 20, and "t6" represents a moment of termination of the inertia phase (a moment of completion of speed synchronization of the shift-down action).

Before the point of time t1 indicated in FIG. 10, the accelerator pedal operation amount θacc is increased as a result of a depressing operation of the accelerator pedal, and the required engine power Pedem is accordingly set, while the engine power Pe is increased toward the required engine power Pedem set as a target value. It is noted that the engine power Pe is increased at a comparatively low rate from a negative value to a positive value during a time period from the point of time t1 to a point of time t3, to prevent a tip-in shock due to tooth butting of gear teeth of the vehicular drive system 12, but is increased at a comparatively high rate toward the required engine power Pedem during a time period from the point of time t3 to the point of time t4.

At the point of time t1, the determination to implement the power-on shift-down action of the step-variable transmission 20 is made in response to an increase of the accelerator pedal operation amount θacc. As soon as the determination to implement the power-on shift-down action has been made, the delay time Tdelay is determined according to the relationship map or maps, and the shift-down command is generated to initiate the shift-down action, at the point of time t2 which is the delay time Tdelay after the point of time t1. In the example of FIG. 10, the delay time Tdelay is determined considering a situation where the excess of the engine power Pe cannot be entirely absorbed by the regenerative control of the second motor/generator MG2.

At the point of time t2 at which the shift-down command is generated, the shift-down action is initiated by lowering the releasing hydraulic pressure Poff of the releasing-side coupling device CB (clutch C2 in the case of the shift-down action from the third speed AT gear position to the second speed AT gear position) to be brought into its released state to implement the shift-down action, to a predetermined standby pressure value, as indicated by a solid line. The releasing hydraulic pressure Poff is held at the standby pressure value. At a point of time slightly after the point of time t2, the engaging hydraulic pressure Pon of the engaging-side coupling device CB (brake B1 in the case of the shift-down action from the third speed AT gear position to the second speed AT gear position) to be brought into its engaged state to implement the shift-down action is temporarily raised for quick filling of the engaging-side coupling device CB, and is then held at a predetermined pressure value, as indicated by a one-dot chain line.

At the point of time t4, the inertia phase of the shift-down action of the step-variable transmission 20 is initiated. After the moment of initiation of the inertia phase, the engine power Pe is increased at a low rate, so that the rate of rise of the input shaft speed ωi is held low. Immediately before the point of time t6 at which the inertia phase is terminated, a regenerative operation of the second motor/generator MG2 is implemented, so as to absorb the excess of the engine power Pe, for thereby reducing the risk of racing of the input shaft speed ωi. At the point of time t6 at which the inertia phase is terminated, the engaging hydraulic pressure Pon of the engaging-side coupling device CB is raised, but the risk of generation of the shifting shock in the process of an engaging action of the engaging-side coupling device CB is reduced in the absence of the racing of the input shaft speed ωi.

In FIG. 10, the input shaft speed ωi indicated by a broken line and a two-dot chain line, and the releasing hydraulic pressure Poff and the battery power Pbat indicated by broken lines are those in the case where the moment of generation of the shift-down command is not delayed so that the excess of the engine power Pe cannot be absorbed by the regenerative control of the second motor/generator MG2. In this case, lowering of the releasing hydraulic pressure Poff of the releasing-side coupling device CB is initiated substantially at the point of time ti at which the determination to implement the shift-down action is made, as indicated by a broken line. As a result, the inertia phase is initiated at the paint of time t3 prior to the point of time t4.

During the time period from the point of time t3 to the point of time t4, the engine power Pe is increased at a high rate so that the input shaft speed ωi is raised at a high rate, as indicated by the broken line and the two-dot chain line. The two-dot chain line indicates the input shaft speed ωi where the regenerative control of the second motor/generator MG2 is not implemented to absorb the engine power Pe, while the broken line indicates the input shaft speed ωi where the regenerative control of the second motor/generator MG2 is implemented, but cannot absorb an entirety of the excess of the engine power Pe generated in the process of the shift-down action. Where the regenerative control of the second motor/generator MG2 is not implemented, the rate of rise of the input shaft speed ωi indicated by the two-dot chain line is higher than that indicated by the broken line where the regenerative control is implemented. Accordingly, the racing of the input shaft speed ωi is generated where the regenerative control is not implemented.

The rate of rise of the input shaft speed ωi indicated by the broken line where the regenerative control of the second motor/generator MG2 is implemented is lower than that of the input shaft speed ωi indicated by the two-dot chain line. However, the regenerative control cannot absorb the entirety of the excess of the engine power Pe due to limitation of the maximum charging amount Win, so that the risk of generation of racing of the input shaft speed ωi cannot be completely prevented. Accordingly, the shift-down action suffers from a shifting shock, while the shifting control response is not deteriorated.

Figure 11:
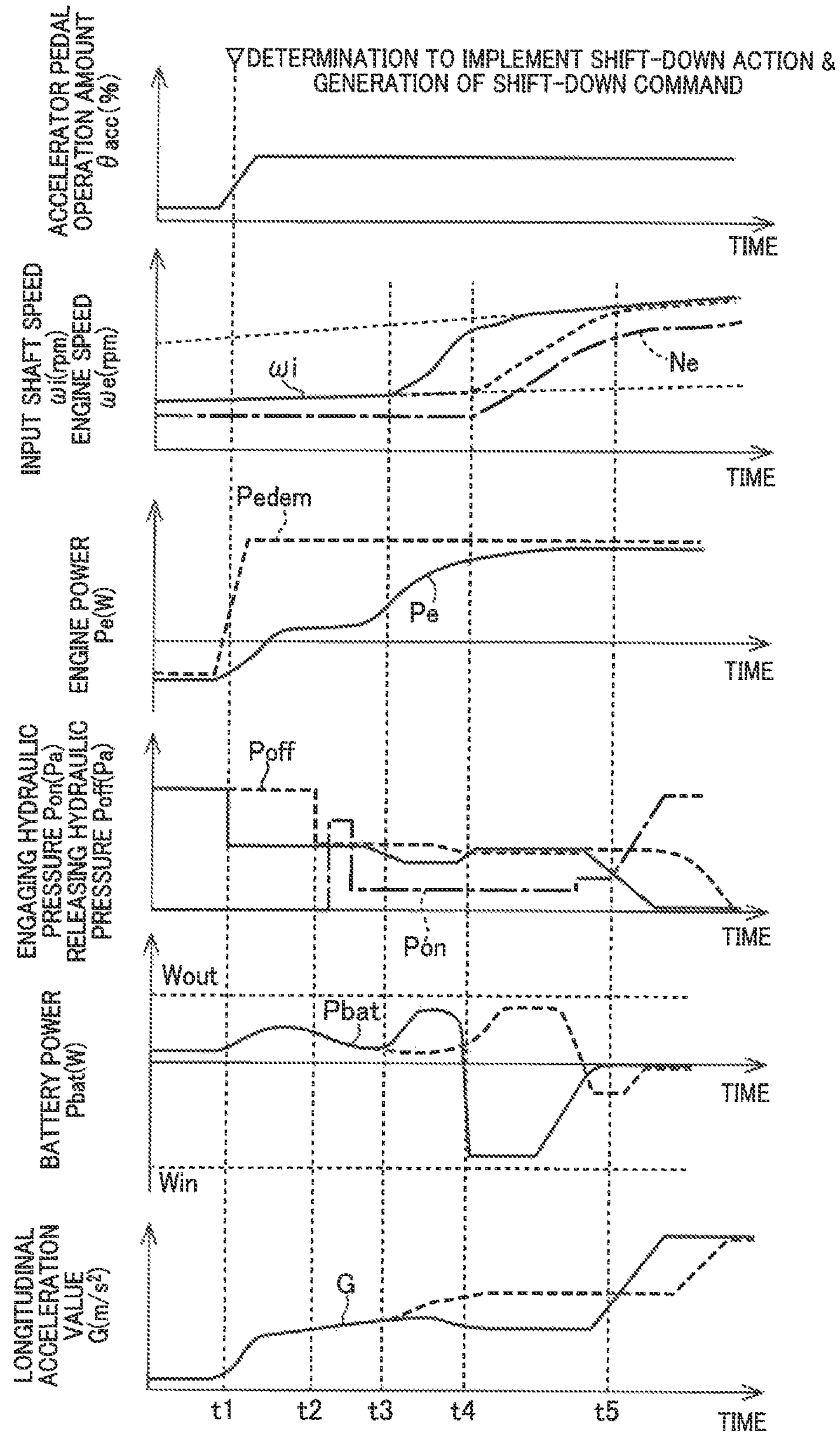
FIG. 11 is a time chart showing another example of changes of various parameters when the control operation illustrated in the flow chart of FIG. 9 is performed.

FIG. 11 is the time chart showing another example of changes of various parameters when the control operation illustrated in the flow chart of FIG. 9 is performed. The time chart of FIG. 11 shows the changes of the various parameters where the risk of generation of the shifting shock of the step-variable transmission 20 can be reduced only by the regenerative control of the second motor/generator MG2. In FIG. 11, "t1" represents the moment at which the determination to implement the shift-down action of the step-variable transmission 20 is made and at which the shift-down command to implement the shift-down action is generated (the hydraulic control command signals Sat are generated), and "t3" represents the moment of initiation of the inertia phase of the shift-down action of the step-variable transmission 20, while "t5" represents the moment of termination of the inertia phase (the moment of completion of speed synchronization of the shift-down action).

At the point of time t1 indicated in FIG. 11, the accelerator pedal operation amount θacc is increased as a result of a depressing operation of the accelerator pedal, and the required engine power Pedem is accordingly set, while the engine power Pe is increased toward the required engine power Pedem set as a target value. At the point of time t1, the determination to implement the power-on shift-down action of the step-variable transmission 20 is made in response to an increase of the accelerator pedal operation amount θacc. In the example of FIG. 11, it is determined at the point of time t1 that the excess of the engine power Pe can be absorbed by the regenerative control of the second motor/generator MG2, so that the delay time Tdelay is set to be zero. For instance, the delay time Tdelay is adjusted to zero on the basis of the maximum charging amount Win exceeding a predetermined threshold, and according to the relationship map representative of a relationship between the delay time Tdelay, and the engine power Pe and the maximum charging amount Win. Accordingly, the shift-down command is generated at the moment of determination to implement the shift-down action, so that the shift-down action is initiated at the point of time t1, without the delay time Tdelay.

Described more specifically, the releasing hydraulic pressure Poff of the releasing-side coupling device CB is lowered to the predetermined standby pressure value, at the point of time t1, and is held at the standby pressure value. Thus, the shift-down action of the step-variable transmission 20 is initiated at the point of time t1, so that the inertia phase of the shift-down action is initiated at the point of time t3. Since the maximum charging amount Win at the point of time t4 is sufficiently large, the engine power Pe is considerably absorbed by the regenerative control of the second motor/generator MG2, so that the rate of rise of the input shaft speed ωi before speed synchronization of the shift-down action is restricted, and the risk of racing of the input shaft speed ωi is reduced. At the point of time t5, it is determined that the inertia phase is terminated, and the engaging hydraulic pressure Pon of the engaging-side coupling device CB is raised. Since the risk of racing of the input shaft speed ωi is reduced at this time, the risk of generation of the shifting shock in the process of the engaging action of the engaging-side coupling device CB is reduced.

In FIG. 11, broken lines indicate the case where the delay time Tdelay is set (so as not to be zero). In this case, the lowering of the releasing hydraulic pressure Poff is initiated at the point of time t2, as indicated by the broken line, and the inertia phase is initiated at the point of time t4. Although the rate of rise of the input shaft speed ωi after the moment of initiation of the inertia phase is restricted, and the risk of racing of the input shaft speed ωi is reduced, the shifting control response of the step-variable transmission 20 is deteriorated. On the contrary, the shift-down command is generated at the moment of determination to implement the shift-down action, according to the present invention, so that the risk of deterioration of the shifting control response is reduced.

According to the present embodiment of the invention described above, the moment of generation of the shift-down command to implement the power-on shift-down action of the step-variable transmission 20 is delayed with respect to the moment of determination to implement the power-on shift-down action, so that the shift-down action is implemented while the output of the engine 14 is stabilized, whereby the risk of generation of the shifting shock of the step-variable transmission 20 can be reduced. In this respect, it is noted that while the degree of reduction of the risk of generation of the shifting shock increases with an increase of the delay time Tdelay from the moment of determination to implement the shift-down action to the moment of generation of the shift-down command, the degree of deterioration of the shifting control response increases with the increase of the delay time Tdelay. In view of this, the present embodiment is configured such that the delay time Tdelay is suitably adjusted on the basis of at least one of the output state of the engine 14 (engine power Pe and required engine power Pedem), the inertia power Pinert, the consumption power Pcb and the state (maximum charging amount Win) of the battery 52. Accordingly, the degree of deterioration of the shifting control response with the increase of the delay time Tdelay can also be reduced. Thus, the delay time Tdelay is suitably adjusted on the basis of at least one of the above-described output state of the engine 14, inertia power Pinert, consumption power Pcb and state of the battery 52, to permit reduction of deterioration of the shifting control response while reducing the risk of generation of the shifting shock.

The present embodiment is further configured to shorten the delay time Tdelay with an increase of the maximum charging amount Win of the battery 52, since the amount of regeneration of the electric power by the second motor/generator MG2 can be increased with an increase of the maximum charging amount Win of the battery 52, so that the excess of the engine power Pe generated in the process of the shift-down action can be absorbed by the regenerative control of the second motor/generator MG2, by an accordingly increased amount. The present embodiment is also configured to shorten the delay time Tdelay with an increase of the engine power Pe at the moment of determination to implement the power-on shift-down action, since the rate of increase of the engine power Pe in the process of the shift-down action decreases with the increase of the engine power Pe. The present embodiment is further configured to shorten the delay time Tdelay with a decrease of the required engine power Pedem, since the rate of increase of the engine power Pe in the process of the shift-down action decreases with the decrease of the required engine power Pedem.

A second embodiment of this invention will be described. It is noted that the same reference signs as used in the first embodiment will be used to identify the elements of the second embodiment corresponding to those of the first embodiment, and that those elements will not be redundantly described.

Second Embodiment

The present second embodiment is configured to estimate at the moment of the determination of the shift-down action whether a shifting shock of the step-variable transmission 20 is generated (whether a shifting performance of the step-variable transmission 20 is deteriorated) if the moment of generation of the shift-down command to implement the shift-down action of the step-variable transmission 20 is not delayed. If it is estimated that the shifting shock is generated, the moment of generation of the shift-down command is delayed.

Figure 12:
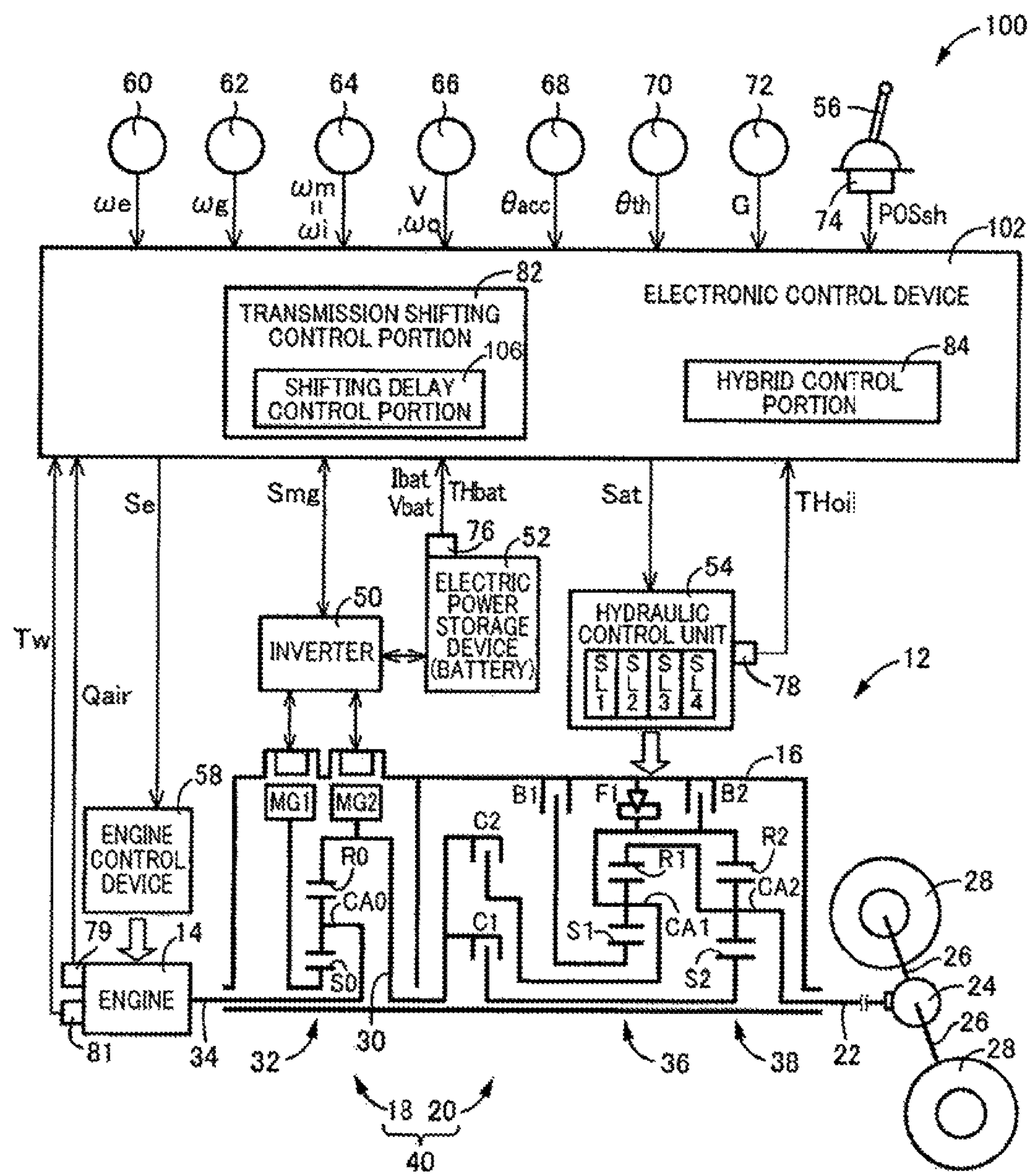
FIG. 12 is a schematic view showing an arrangement of another example of the vehicular drive system to be controlled by an electronic control device according to another embodiment of the present invention, and major control functions and control portions of the electronic control device.

FIG. 12 is the schematic view showing an arrangement of the vehicular drive system 12 of a vehicle 100 to be controlled by a control apparatus according to the second embodiment of the present invention, and major control functions and control portions of the control apparatus. The vehicular drive system 12 of the vehicle 100 is identical in construction to that in the first embodiment, and will not be redundantly described.

The vehicle 100 is controlled by an electronic control device 102, which receives the same input signals (such as the signal indicative of the engine speed ωe) as in the first embodiment. Further, the electronic control device 102 generates the same output signals as in the first embodiment, such as the engine control command signal Se, the motor/generator control command signals Smg and the hydraulic control command signals Sat.

The electronic control device 102 includes the transmission shifting control portion 82 and the hybrid control portion 84. The transmission shifting control portion 82 includes a shifting delay control portion 106. The transmission shifting control portion 82 and the hybrid control portion 84 in this second embodiment are basically identical with those in the first embodiment, and will not be redundantly described, with the same reference signs being used to identify the corresponding elements.

At the moment of determination to implement the shift-down action of the step-variable transmission 20, the shifting delay control portion 106 estimates whether a shifting shock of the step-variable transmission 20 is generated if the moment of generation of the shift-down command is not delayed. If it is estimated that the shifting shock is generated if the moment of generation of the shift-down command is not delayed, the shifting delay control portion 106 determines that the moment of generation of the shift-down command should be delayed. If it is estimated that the shifting shock is not generated even if the moment of generation of the shift-down command is not delayed, the shifting delay control portion 106 determines that the moment of generation of the shift-down command should not be delayed.

The shifting delay control portion 106 implements the estimation as to whether a shifting shock of the step-variable transmission 20 is generated if the moment of generation of the shift-down command is not delayed, depending upon whether the engine 14 is held at rest, or on the basis of the working fluid temperature THoil.

If the engine 14 is started at the moment of determination to implement the shift-down action after the engine 14 has been held at rest, the engine power Pe will not considerably increase in the process of the shift-down action. Accordingly, there is a low risk of generation of the shifting shock without delaying the moment of generation of the shift-down command, where the engine 14 is held at rest. Therefore, the shifting delay control portion 106 estimates that the shifting shock will not be generated even if the moment of generation of the shift-down command is not delayed, where the engine 14 is held at rest at the moment of the determination of the shift-down action.

It is also noted that an amount of variation of a torque transmitted through the releasing-side and engaging-side coupling devices CB increases with a drop of the working fluid temperature THoil, so that the accuracy of calculation of the consumption power Pcb is accordingly reduced. Therefore, the shifting delay control portion 106 estimates that where the working fluid temperature THoil is lower than a predetermined threshold value THlow, there is a risk of generation of the shifting shock if the moment of generation of the shift-down command is not delayed. This estimation is based on a fact that where the working fluid temperature THoil is lower than the threshold value THlow, the consumption power Pcb is considerably reduced, namely, the excess of the engine power Pe is not consumed by the consumption power Pcb. Thus, the estimation as to whether there is a risk of generation of the shifting shock if the moment of generation of the shift-down command is not delayed is implemented.

If the shifting delay control portion 106 has estimated that there is a risk of generation of the shifting shock if the moment of generation of the shift-down command is not delayed, the shifting delay control portion 106 commands the transmission shifting control portion 82 to delay the moment of generation of the shift-down command with respect to the moment of determination to implement the shift-down action. Accordingly, the moment of generation of the shift-down command is delayed with respect to the moment of determination to implement the shift-down action, if it is estimated that there is a risk of generation of the shifting shock if the moment of generation of the shift-down command is not delayed. Since the moment of initiation of the shift-down action is delayed, so that the engine power Pe in the process of the shift-down action is more stabilized than where the moment of generation of the shift-down command is not delayed, whereby the risk of generation of the shifting shock is reduced. It is noted that if it is estimated that there is a risk of generation of the shifting shock, the delay time Tdelay is set or adjusted according to at least one relationship map in the same manner as described above with respect to the first embodiment.

If it is estimated that there is not a risk of generation of the shifting shock even if the moment of generation of the shift-down command is not delayed, the shifting delay control portion 106 commands the transmission shifting control portion 82 to generate the shift-down command at the moment of determination to implement the shift-down action. Thus, the moment of generation of the shift-down command is not delayed, and the shift-down action is initiated at the moment of determination to implement the shift-down action, if it is estimated that there is not a risk of generation of the shifting shock even if the moment of generation of the shift-down command is not delayed. Accordingly, the risk of deterioration of the shifting control response is reduced while at the same time the risk of generation of the shifting shock is reduced.

Figure 13:
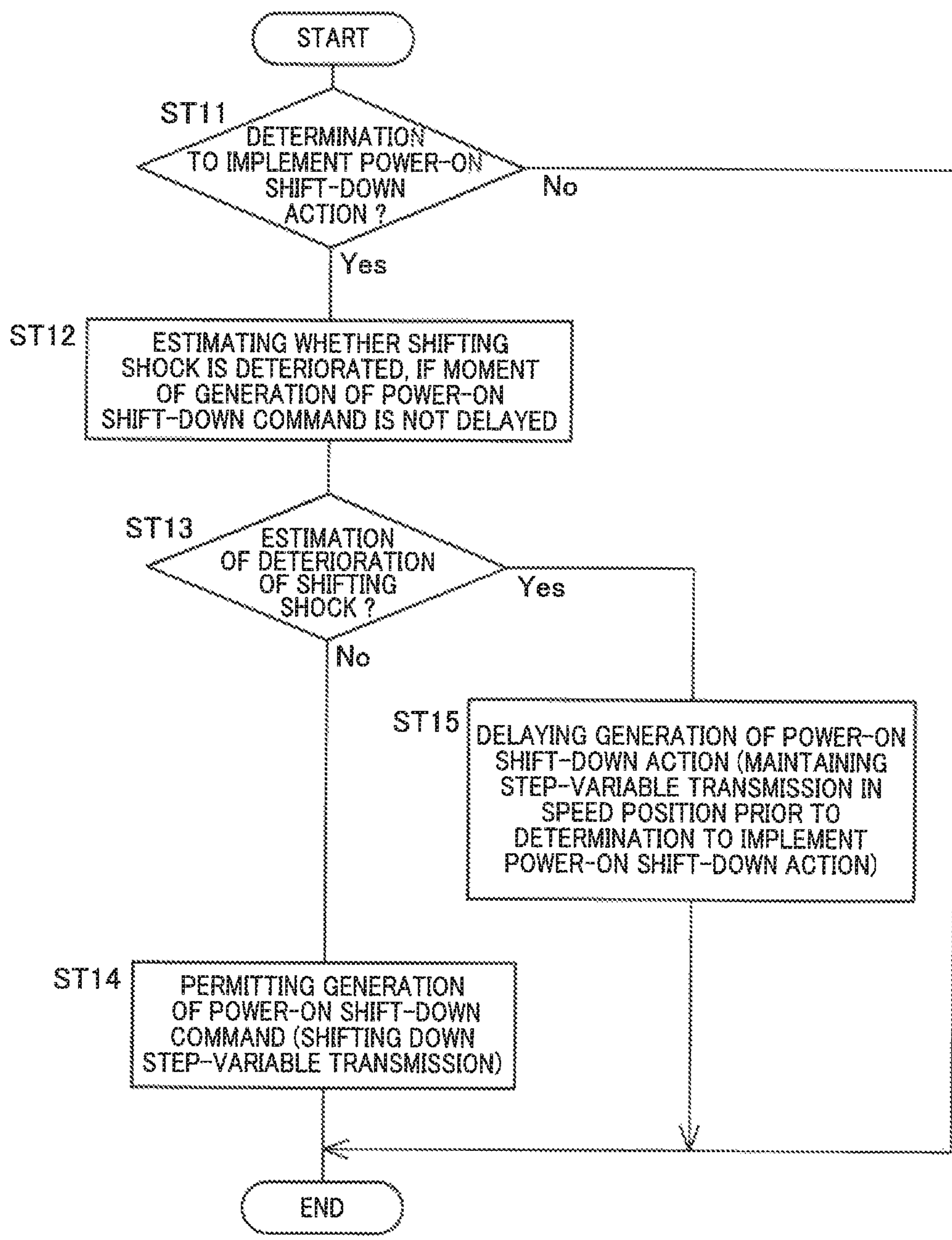
FIG. 13 is a flow chart illustrating an essential part of a control routine executed by the electronic control device shown in FIG. 12, namely, a control operation implemented so as to reduce a risk of generation of a shifting shock and a risk of deterioration of a shifting control response of the step-variable transmission in the process of its power-on shift-down action.

FIG. 13 is the flow chart illustrating an essential part of a control routine executed by the electronic control device 102 shown in FIG. 12, namely, a control operation implemented so as to reduce the risk of generation of the shifting shock of the step-variable transmission 20 in the process of its power-on shift-down action, and the risk of deterioration of the shifting control response of the step-variable transmission 20. This control operation is repeatedly performed during running of the vehicle 100.

The control operation is initiated with a step ST11 corresponding to a function of the transmission shifting control portion 82, to determine whether a determination to implement a power-on shift-down action of the step-variable transmission 20 has been made or not. If a negative determination is obtained in the step ST11, one cycle of execution of this control routine is terminated. If an affirmative determination is obtained in the step ST11, the control flow goes to a step ST12 corresponding to a function of the shifting delay control portion 106, to estimate whether there is a risk of generation of the shifting shock if the moment of generation of the shift-down command is not delayed with respect to the moment of determination to implement the shift-down action.

The step ST12 is followed by a step ST13 also corresponding to the function of the shifting delay control portion 106, to determine whether it has been estimated in the step ST12 that there is a risk of generation of the shifting shock if the moment of generation of the shift-down command is not delayed. If an affirmative determination is obtained in the step ST13, the control flow goes to a step ST15 corresponding to the functions of the transmission shifting control portion 82 and the shifting delay control portion 106, to delay the moment of generation of the shift-down command with respect to the moment of determination to implement the shift-down action. If a negative determination is obtained in the step ST13, on the other hand, the control flow goes to a step ST14 also corresponding to the functions of the transmission shifting control portion 82 and the shifting delay control portion 106, to generate the shift-down command at the moment of determination to implement the shift-down action, so that the shift-down action is initiated. Thus, the second embodiment is configured to estimate, at the moment of determination to implement the shift-down action, whether there is a risk of generation of the shifting shock if the moment of generation of the shift-down command is not delayed, and to delay the moment of generation of the shift-down command only where it has been estimated that there is the risk of generation of the shifting shock, so that the risk of deterioration of the shifting control response is reduced while at the same time the risk of generation of the shifting shock is reduced.

The control apparatus according to the second embodiment described above is configured to make it possible to prevent an unnecessary delay of initiation of the shift-down action where it is determined that there is not a risk of generation of the shifting shock even if the moment of generation of the shift-down command is not delayed. Accordingly, the risk of deterioration of the shifting control response can be reduced while at the same time the risk of generation of the shifting shock can be reduced. The second embodiment is further configured to determine that there is not a risk of generation of the shifting shock even if the moment of generation of the shift-down command is not delayed, while the engine 14 is held at rest, since a rate of increase of the output of the engine 14 is not considerably increased even if the engine 14 is started in the process of the shift-down action while the engine 14 is held at rest. Further, the control apparatus according to the second embodiment of the invention is configured to determine that there is the risk of generation of the shifting shock if the moment of generation of the shift-down command is not delayed, while the working fluid temperature THoil is lower than the predetermined threshold value THlow, since the accuracy of control of the shift-down action is deteriorated while the working fluid temperature THoil is lower than the threshold value THlow. Thus, it is possible to estimate the risk of generation of the shifting shock where the moment of generation of the shift-down command is not delayed, depending upon whether the engine 14 is held at rest, or on the basis of the working fluid temperature THoil.

While the preferred embodiments of this invention have been described in detail by reference to the drawings, it is to be understood that the invention may be otherwise embodied.

In the illustrated embodiments, the vehicle 10 is a hybrid vehicle provided with the drive power source in the form of the engine 14, the differential mechanism 32, and the first motor/generator MG1. However, the principle of the present invention is equally applicable to any other type of hybrid vehicle, for example, a one motor type hybrid vehicle provided with only one motor/generator a regenerative operation of which is controllable and which is disposed in a power transmitting path between an engine and a step-variable transmission in a power transmittable manner. Namely, the principle of the present invention is applicable to a hybrid vehicle provided with an engine, and a motor/generator which permits absorption of a portion of a drive force to be transmitted to a step-variable transmission (a regenerative operation of which is controllable). Further, the step-variable transmission of the vehicle to be controlled by the control apparatus according to the invention may have any number of AT gear positions, and may have any configuration of connection of its rotary members.

The illustrated embodiments may be combined together as needed. For example, the control apparatus according to the invention may be configured to estimate, at the moment of determination of the shift-down action of the step-variable transmission 20, whether the shifting shock of the step-variable transmission is generated or not, if the moment of generation of the shift-down command to implement the shift-down action of the step-variable transmission is not delayed, to determine the delay time Tdelay on the basis of at least one of the engine power Pe, the required engine power Pedem, the consumption power Pcb, the inertia power Pinert and the maximum charging amount Win of the battery 52 if it is estimated that the shifting shock is generated, and to delay the moment of generation of the shift-down command with respect to the moment of determination to implement the shift-down action, by the determined delay time Tdelay.

In the illustrated embodiments, the stored electric power amount SOC is used as the value relating to the maximum charging amount Win, while the vehicle running speed V is used as the value relating to the inertia power Pinert. However, values relating to the other parameters such as the engine power Pe, the required engine power Pedem and the consumption power Pcb may be used in the relationship maps to determine the delay time Tdelay. For instance, the delay time Tdelay may be determined according to a relationship map representative of a relationship between the delay time Tdelay and the accelerator pedal operation amount θacc relating to the engine power Pe, or a relationship map representative of a relationship between the delay time Tdelay and the working fluid temperature THoil relating to the consumption power Pcb. It is noted that any other values relating to the five parameters described above may be used to determine the delay time Tdelay.

In the illustrated embodiments, the engine power Pe and the required engine power Pedem of the engine 14 are used as the parameters to determine the delay time Tdelay. However, the engine power Pe and the required engine power Pedem may be replaced by the torque Te and a required torque Tedem of the engine 14.

It is to be understood that the embodiments and modifications described above are given for illustrative purpose only, and that the present invention may be embodied with various other changes and improvements which may occur to those skilled in the art.

NOMENCLATURE OF ELEMENTS

10, 100: Vehicle
14: Engine (Drive power source)
20: Step-variable transmission
28: Drive wheels
30: Intermediate power transmitting member (Input shaft)
32: Differential mechanism
52: Battery
54: Hydraulic control unit
80, 102: Electronic control device (Control apparatus)
82,: Transmission shifting portion (Control portion)
86, 106: Shifting delay control portion
MG1: First motor/generator
MG2: Second motor/generator (Motor/generator)
RE1: First rotary element
RE2: Second rotary element
RE3: Third rotary element
Tdelay: Delay time

What is claimed is:

1. A control apparatus for a vehicle provided with a drive power source, a step-variable transmission which is disposed in a power transmitting path between the drive power source and drive wheels and which includes a plurality of coupling devices, and a motor/generator which is disposed between the drive power source and the step-variable transmission in a power transmittable manner and which is operable to implement a regenerative operation, the control apparatus comprising:

a processor programmed to:

delay a moment of generation of a shift-down command to implement a power-on shift-down action of the step-variable transmission, with respect to a moment of determination to implement the power-on shift-down action, for thereby reducing a shifting shock of the step-variable transmission in the process of the power-on shift-down action; and adjust a delay time from the moment of determination to implement the power-on shift-down action to the moment of generation of the shift-down command, on the basis of at least one of: an output state of the drive power source; an inertia power required in the process of the power-on shift-down action; a consumption power to be consumed by the coupling devices; and a state of a battery to and from which an electric power is respectively supplied from and to the motor/generator.

2. The control apparatus according to claim 1, wherein the processor is programmed to:

control a shifting action of the step-variable transmission, determine whether there is a risk of generation of a shifting shock of the step-variable transmission when the moment of generation of the shift-down command is not delayed, not delay the moment of generation of the shift-down command when the processor determines that there is not the risk of generation of the shifting shock, and delay the moment of generation of the shift-down command when the processor determines that there is the risk of generation of the shifting shock.

3. The control apparatus according to claim 2, wherein the processor is programmed to:

determine that there is not the risk of generation of the shifting shock even when the moment of generation of the shift-down command is not delayed, while the drive power source is held at rest, and that there is the risk of generation of the shifting shock when the moment of generation of the shift-down command is not delayed, where a temperature of a working fluid flowing through a hydraulic control unit provided for controlling the step-variable transmission is lower than a predetermined threshold value.

4. The control apparatus according to claim 1, wherein the processor is programmed to:

shorten the delay time with an increase of a maximum charging amount of the battery.

5. The control apparatus according to claims 1, wherein the processor is programmed to:

shorten the delay time with an increase of a power of the drive power source at the moment of determination to implement the power-on shift-down action.

6. The control apparatus according to claim 1, wherein the processor is programmed to:

shorten the delay time with a decrease of a power of the drive power source required after completion of the power-on shift-down action.

7. The control apparatus according to claim 1, wherein the vehicle is provided with: an engine functioning as the drive power source; a first motor/generator; a differential mechanism comprising a first rotary element operatively connected to the engine in a power transmittable manner, a second rotary element operatively connected to the first motor/generator in a power transmittable manner, and a third rotary element operatively connected to an input shaft of the step-variable transmission in a power transmittable manner; and a second motor/generator which is operatively connected to the third rotary element and which serves as the motor/generator operable to implement the regenerative operation.

* * * * *